US012079290B2

(12) United States Patent
McCann et al.

(10) Patent No.: US 12,079,290 B2
(45) Date of Patent: Sep. 3, 2024

(54) SYSTEMS AND METHODS FOR A CUSTOMIZED SEARCH PLATFORM

(71) Applicant: SuSea, Inc., Palo Alto, CA (US)

(72) Inventors: Bryan McCann, Palo Alto, CA (US); Swetha Mandava, Palo Alto, CA (US); Nathaniel Roth, Palo Alto, CA (US); Richard Socher, Palo Alto, CA (US)

(73) Assignee: SuSea, Inc., Palo Alto, CA (US)

( * ) Notice: Subject to any disclaimer, the term of this patent is extended or adjusted under 35 U.S.C. 154(b) by 0 days.

(21) Appl. No.: 17/981,102

(22) Filed: Nov. 4, 2022

(65) Prior Publication Data

US 2023/0141023 A1 May 11, 2023

Related U.S. Application Data

(60) Provisional application No. 63/277,091, filed on Nov. 8, 2021.

(51) Int. Cl.
*G06F 16/90* (2019.01)
*G06F 16/9535* (2019.01)
*G06F 16/9538* (2019.01)
*G06F 16/954* (2019.01)

(52) U.S. Cl.
CPC ...... *G06F 16/9535* (2019.01); *G06F 16/9538* (2019.01); *G06F 16/954* (2019.01)

(58) Field of Classification Search
None
See application file for complete search history.

(56) References Cited

U.S. PATENT DOCUMENTS

| 8,271,429 B2* | 9/2012 | Ghuneim | G06F 16/248 |
| | | | 707/602 |
| 2011/0191316 A1* | 8/2011 | Lai | G06F 16/9535 |
| | | | 707/706 |
| 2016/0092563 A1* | 3/2016 | Luo | G06F 3/0488 |
| | | | 707/722 |
| 2019/0179861 A1 | 6/2019 | Goldenstein et al. | |

OTHER PUBLICATIONS

International Search Report and Written Opinion of PCT/US2022/079383 dated Jan. 31, 2023, 14 pages.
Baeza-Yates: "Semantic Query Understanding", SIRIP2: Start-Up Research Academic Collaboration, SIGIR'17, Aug. 7-11, 2017, Shinjuku, Tokyo, Japan, p. 1357.
Safhi et al., "Data Source Selection in Big Data Context", The 21st International Conference of Information Integration and Web-based Applications & Services (iiWAS2019) Dec. 2-4, 2019, Munich, Germany, ACM, New York, NY, 6 pages.

* cited by examiner

*Primary Examiner* — Belix M Ortiz Ditren
(74) *Attorney, Agent, or Firm* — Haynes and Boone, LLP

(57) ABSTRACT

Embodiments described herein provide systems and methods for a customized search platform that provides users control and transparency in their searches. The system may use a ranker and parser to utilize input data and contextual information to identify search applications, sort the search applications, and present search results via user-engageable elements. The system may also use input from a user to personalize and update search results based on a user's interaction with user-engageable elements.

20 Claims, 20 Drawing Sheets

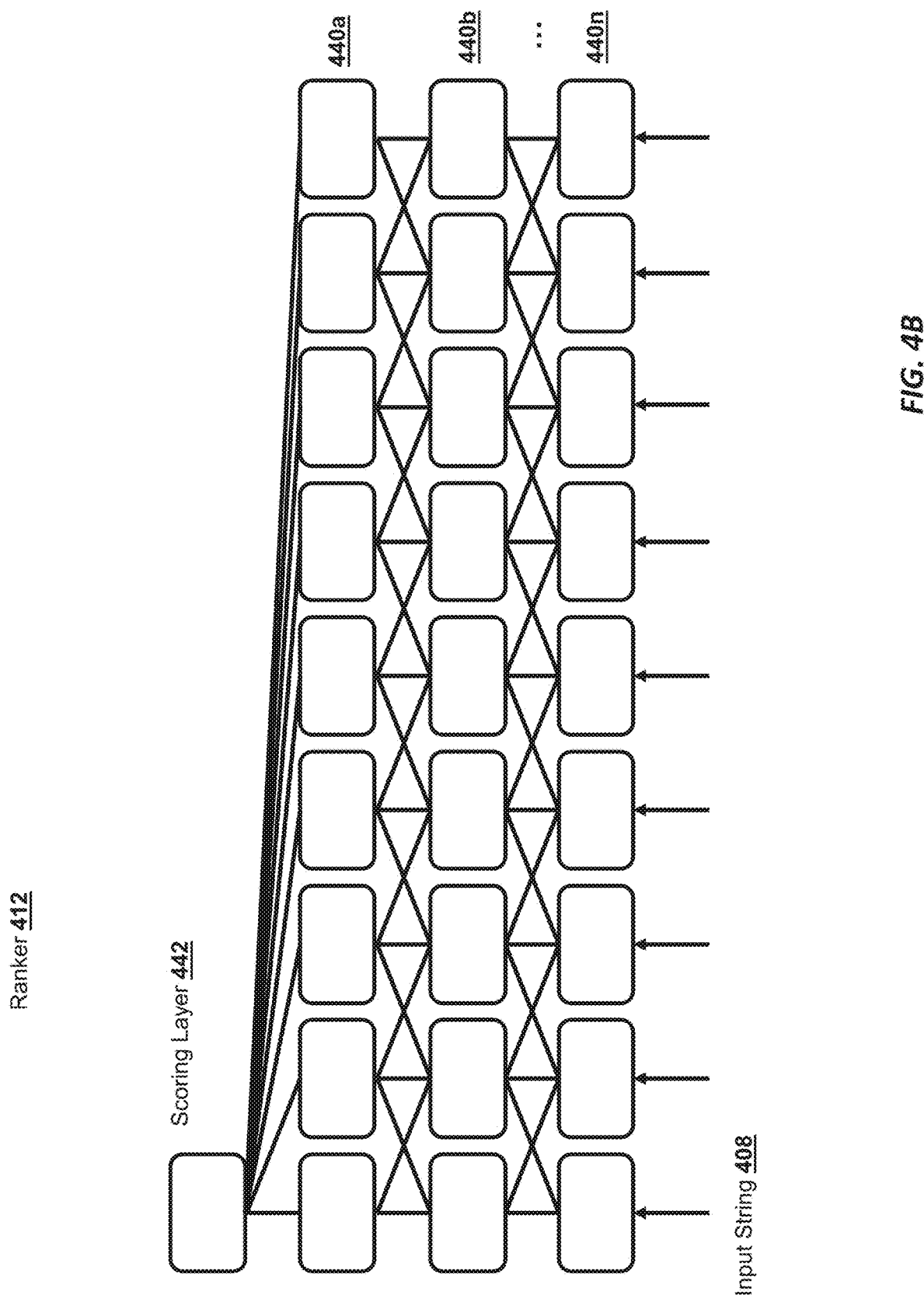

SYSTEMS AND METHODS FOR A CUSTOMIZED SEARCH PLATFORM

CROSS REFERENCE(S)

The instant application is a nonprovisional of and claim priority under 35 U.S.C. 119 to U.S. provisional application No. 63/277,091, filed Nov. 8, 2021, which is hereby expressly incorporated by reference herein in its entirety.

TECHNICAL FIELD

The embodiments relate generally to search engines, and more specifically to systems and methods for a customized search platform.

BACKGROUND

Search engines allow a user to provide a search query and return search results in response. Search sites such as Google.com, Bing.com, and/or the like usually provide a list of search results to a user from all sorts of data sources. For example, these existing search engines usually crawl web data to collect search results that are relevant to a search query. However, a user has little control or transparency on how or where the search engines conduct their search and what kind of search results they are going to get.

Therefore, there is a need for a customized search platform that provides users both control and transparency with regard to the searches they perform.

BRIEF DESCRIPTION OF THE DRAWINGS

FIG. 4B is a simplified block diagram of the ranker shown in FIG. 4A, as described with respect to FIG. 4A.

Figure 1:
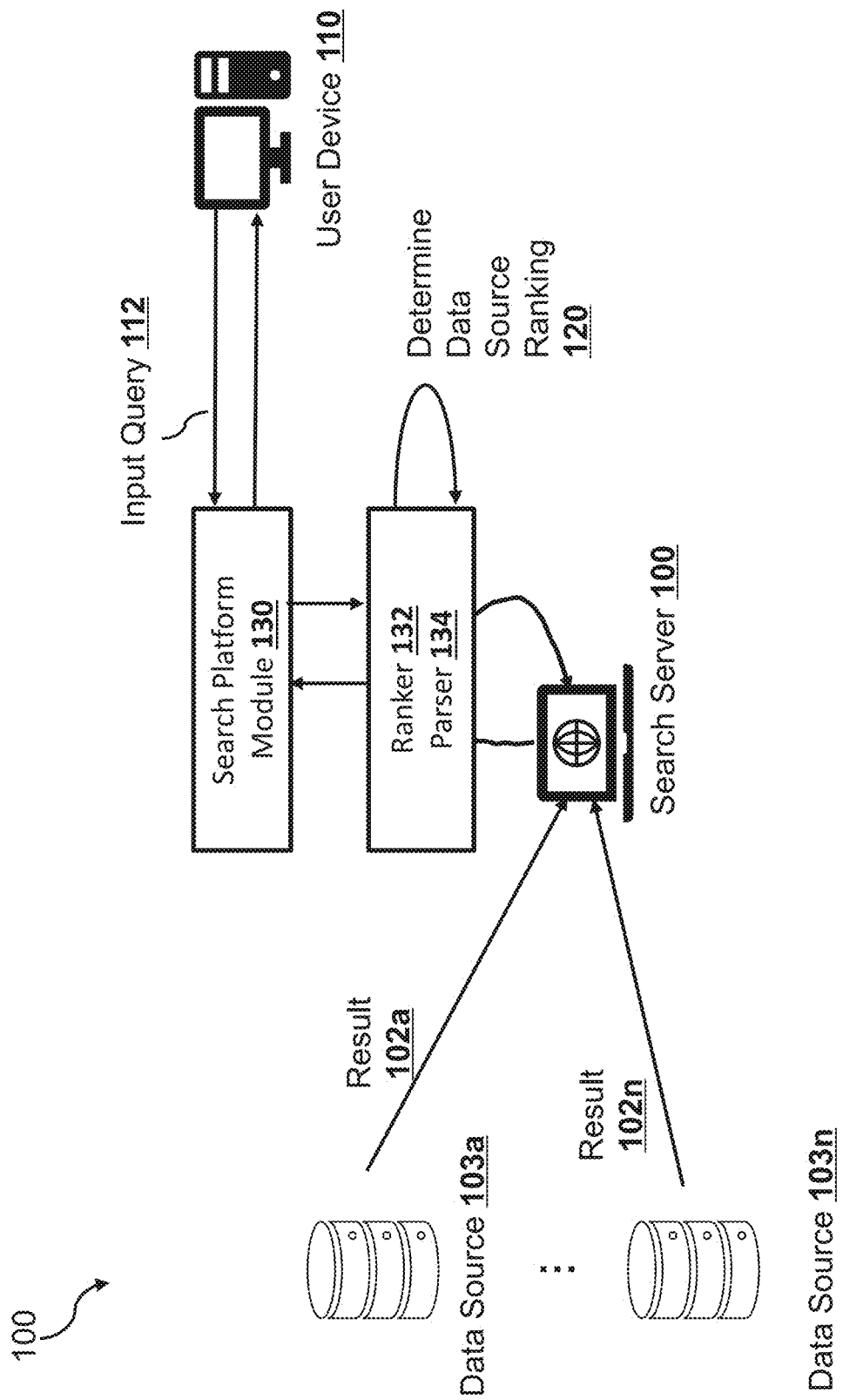
FIG. 1 is a simplified diagram illustrating a data flow between entities during a search, according to one embodiment described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

The present application generally relates to search engines, and more specifically to systems and methods for a customized search platform.

Search engines allow a user to provide a search query and return search results in response. Search sites such as Google.com, Bing.com, and/or the like usually adopts a centralized structure that provides a list of search results to a user from all sorts of data sources. For example, these existing search engines usually crawl web data to collect search results that are relevant to a search query. However, a user has little control or transparency on how or where the search engines conduct their search. In addition, a user has little control on how their personal or private information is collected or used by generic search engines. For example, users may often want to engage with dedicated databases for specific searches. For example, human resource staff may use background check websites to search for potential new hires. For another example, legal professionals may search a juris database such as LexisNexis for case law. However, these dedicated databases are often scattered and difficult for a layperson to use, e.g., requiring a certain level of professional knowledge to enter the most effective search strings.

For example, when a user searches for "U.S. patent Ser. No. 12/345,678," a search engine such as Google or Bing may likely provide a list of search results such as Internet articles that mention the patent number "12345678." If the user is indeed looking for the actual patent document for "U.S. patent Ser. No. 12/345,678," preferably from an authorized data source such as the U.S. patent office database, going through all the search results can be cumbersome and inefficient for the user. User search experience is thus unsatisfactory in this type of search service.

In view of the need for improved user search experience, embodiments described herein provide systems and methods for a customized search platform. Specifically, the search system includes a web-based or mobile application platform that provides customized search experience for an individual user to have control over searches conducted at user preferred data sources. In one embodiment, the search system may, in response to a search query, determine one or more prioritized data sources based on the characteristics of the search query. For example, if the search query relates to a person's name such as "Richard Socher," data sources such as social media (e.g., Facebook LinkedIn, Twitter, etc.), news media (e.g., Silicon Valley press, etc.), and/or the like, may be prioritized. For another example, if the search query relates to an abstract item such as "QRNN," common knowledge data sources (e.g., Wikipedia, etc.), academic data sources (e.g., arXiv, Stanford course materials, etc.), discussion sources (e.g., Quora, Reddit, etc.) may be prioritized.

In addition, a user may select or deselect data sources for his or her own searches, and the search platform may conduct a search query submitted by the user only at, or at least prioritize data sources that the user is interested in, and/or exclude data sources the user has disapproved.

In one embodiment, a user may actively select data sources he or she is interested in via a user account management page with the search platform. For example, the user may actively select Wikipedia, Reddit, Arxiv.org, and/or the like, to be the preferred data sources. As a result, if the user search for "QRNN," search results grouped per user selected data sources, e.g., Wikipedia, Reddit, Arxiv.org, may be presented to the user via a search user interface. The user can click on the icon of a data source, e.g., Reddit, and see a list of search results such as discussion threads relating to "QRNN" that are provided specifically from the data source "Reddit." For another example, if the user clicks on the icon of "Wikipedia," the Wikipedia page for "QRNN" may be provided.

In another embodiment, the search system may monitor user preference during user interaction with search results. For example, if the user actively elects "dislike" a displayed search result from a particular data source, or rarely interacts with search results from a particular data source, the search system may deprioritize search results from this particular data source. In the above example, if the user chooses to dislike or unselect search results from the data source "Reddit," the Reddit icon may be removed from the user interface presenting search results.

In this way, by focusing on prioritized data sources based on characteristics of the search query itself and further prioritizing and filtering data sources per user preferences, the search system largely reduces computational complexity and improves search efficiency. Also, by allowing the user to have transparency and control over search data sources, user experience is largely improved.

Overview

FIG. 1 is a simplified diagram illustrating a data flow between entities implementing the processes described in FIGS. 2-7, according to one embodiment described herein. A user interacts with user device 110, which in turn interacts with a search server 100 through input queries 112 provided by the user. Computing device 100 interacts with various data sources 103a-n (collectively referred to as 103). For example, the data sources 103a-n may be any number of available databases, webpages, servers, blogs, content providers, cloud servers, and/or the like. As described in further detail below with reference to FIGS. 5-6, search server 100 utilizes a parser 134 and ranker 132 to identify data sources 103 relevant to the input query 112, obtains search results from data sources 103, ranks 120 the search results, and presents the search results to the user via user device 110 to display sets of search results in user-engageable elements.

Common data sources 103a-n may include Wikipedia, Reddit, Twitter, Instagram (and/or social media), and/or the like. However, for different input queries 112, the search system may intelligently recommend what kind of data sources 103 may be most relevant to the specific search query. For example, when a user types in a search for "Quasi convolutional neural network," the search system may preliminarily determine (or categorize via a classifier) that the search term relates to a technical topic. Therefore, suitable data sources 103 may be identified as a knowledge base such as "Wikipedia," a discussion forum on which users may discuss technical topics such as "Reddit," an archive of scientific manuscript such as "arXiv" and/or the like may most likely be relevant or interesting to the user based on the input query 112. The search system may then recommend these data sources 103 to the user.

In a different example, if the user performs a search with the input query 112 "Richard Socher," which the search system may categorize it as the name of a person, the search system may rank the proposed data sources to include data sources 103 that are more relevant to people, such as "Instagram," "LinkedIn," "Google Scholar," and/or the like.

In another embodiment, as described in further detail below with reference to FIG. 7, the user can interact with the search results via user device 110 through user-engageable elements. In this way, the computing device 100 can refine search results to better tailor results to a user's desires and preferences by allowing a user to customize their preferred data sources 103. A user may choose to submit whether they prefer or do not prefer a particular data source by clicking on a "thumbs up" or "thumbs down" icon. Based on user submitted preferences, the search system may re-arrange and re-prioritize data sources. For example, if the user has elected "thumbs up" for "LinkedIn" but "thumbs down" for "Instagram," when the user searches for a person's name such as "Richard Socher," The search system may prioritize data sources such as LinkedIn but may deprioritize data source such as "Instagram."

Computer and Networked Environment

Figure 2:
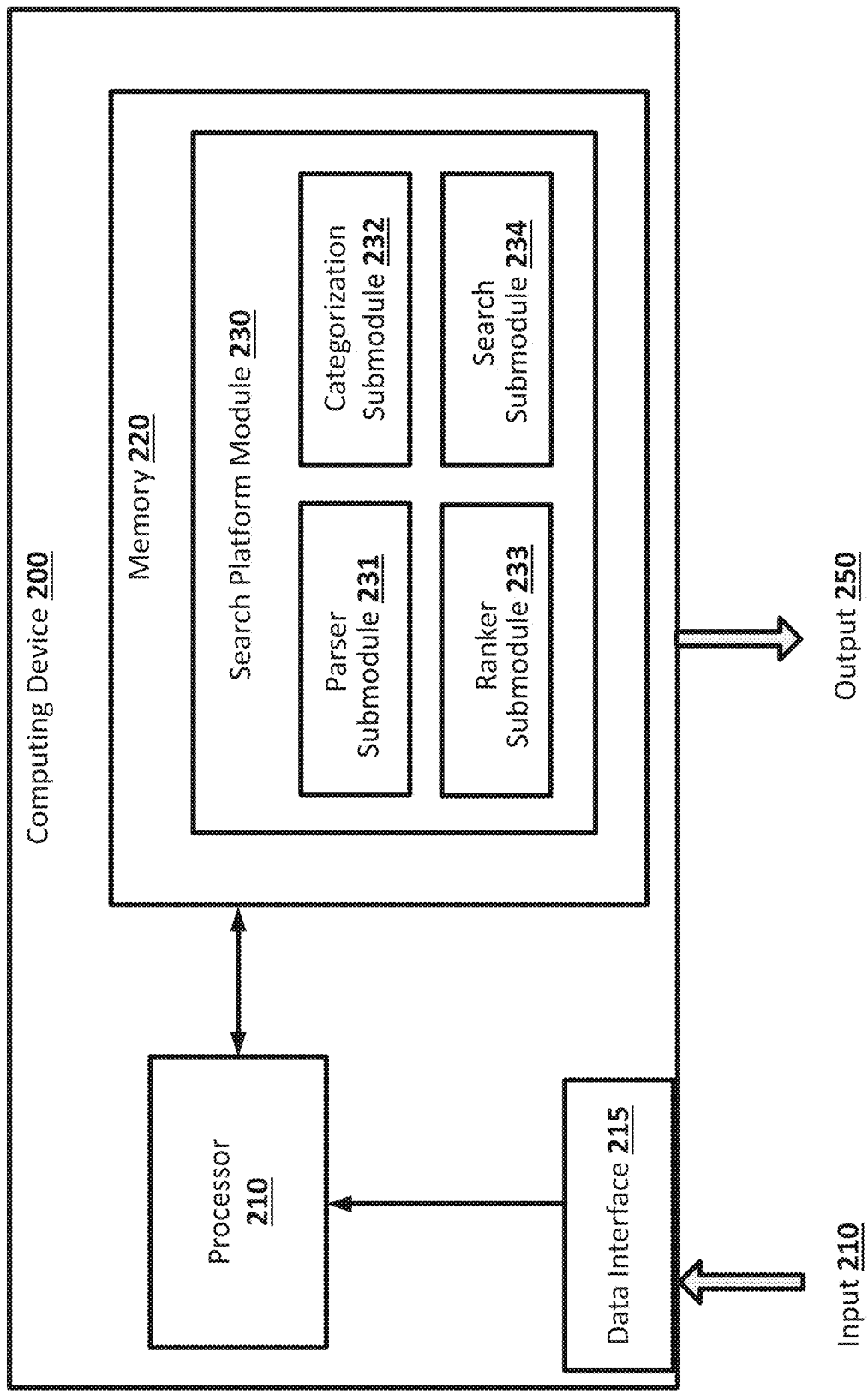
FIG. 2 is a simplified diagram illustrating a computing device implementing the search described in FIG. 1, according to one embodiment described herein.

FIG. 2 is a simplified diagram illustrating a computing device 200 implementing the customized search server 100 described in FIG. 1, according to one embodiment described herein. As shown in FIG. 2, computing device 200 includes a processor 210 coupled to memory 220. Operation of computing device 100 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200.

Computing device 200 may be implemented as a standalone subsystem, as a board added to a computing device, and/or as a virtual machine. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 200 in a manner as follows.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for search platform module 230 that may be used to implement and/or emulate the systems and models, and/or to implement any of the methods described further herein. A search platform module 230 may receive input 240 such as an input search query (e.g., a word, sentence, or other input provided by a user to perform a search) via the data interface 215 and generate an output 250 which may be one or more user-engageable elements presenting the search results according to different data sources. For instance, if input data including a name, such as "Richard Socher," is provided, output data may include user-engageable elements showing results from "Twitter," "Facebook," "Instagram," "TikTok," or other social media websites. If input data including a food, such as "pumpkin pie," is provided, output data may include user-engageable elements showing results from "All Recipes," "Food Network," or other food-related websites. If input data related to coding, such as an error in python, is provided, output data may include user-engageable elements showing results from "StackOverflow," "Reddit," or other webpages or blogs oriented towards coding assistance.

The data interface 215 may comprise a communication interface, a user interface (such as a voice input interface, a graphical user interface, and/or the like). For example, the computing device 200 may receive the input 240 (such as a search query) from a networked database via a communication interface. Or the computing device 200 may receive the input 240, such as search queries, from a user via the user interface.

In some embodiments, the search platform module 230 is configured to parse inputs, categorize the inputs, and rank results. The search platform module 230 may further include a parser submodule 231, a categorization submodule 232, a ranker submodule 233 (e.g., similar to ranker 412 and parser 414 in FIG. 4A), and a search submodule 234. In one embodiment, the search platform module 230 and its submodules 231-234 may be implemented by hardware, software and/or a combination thereof.

In some embodiments, the search system adopts a search platform module 230 to generate and filter search results from all different data sources. For example, the search platform may include a ranker 233 and a parser 231 as shown in FIGS. 1-4A, to ingest user query, user contextual information, and other contextual information to coordinate which data sources are relevant, which corresponding data source application programming interfaces (APIs) should be contacted, how to parse the user query for each Search APP API, and ultimately the final ranked order of the data source results.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
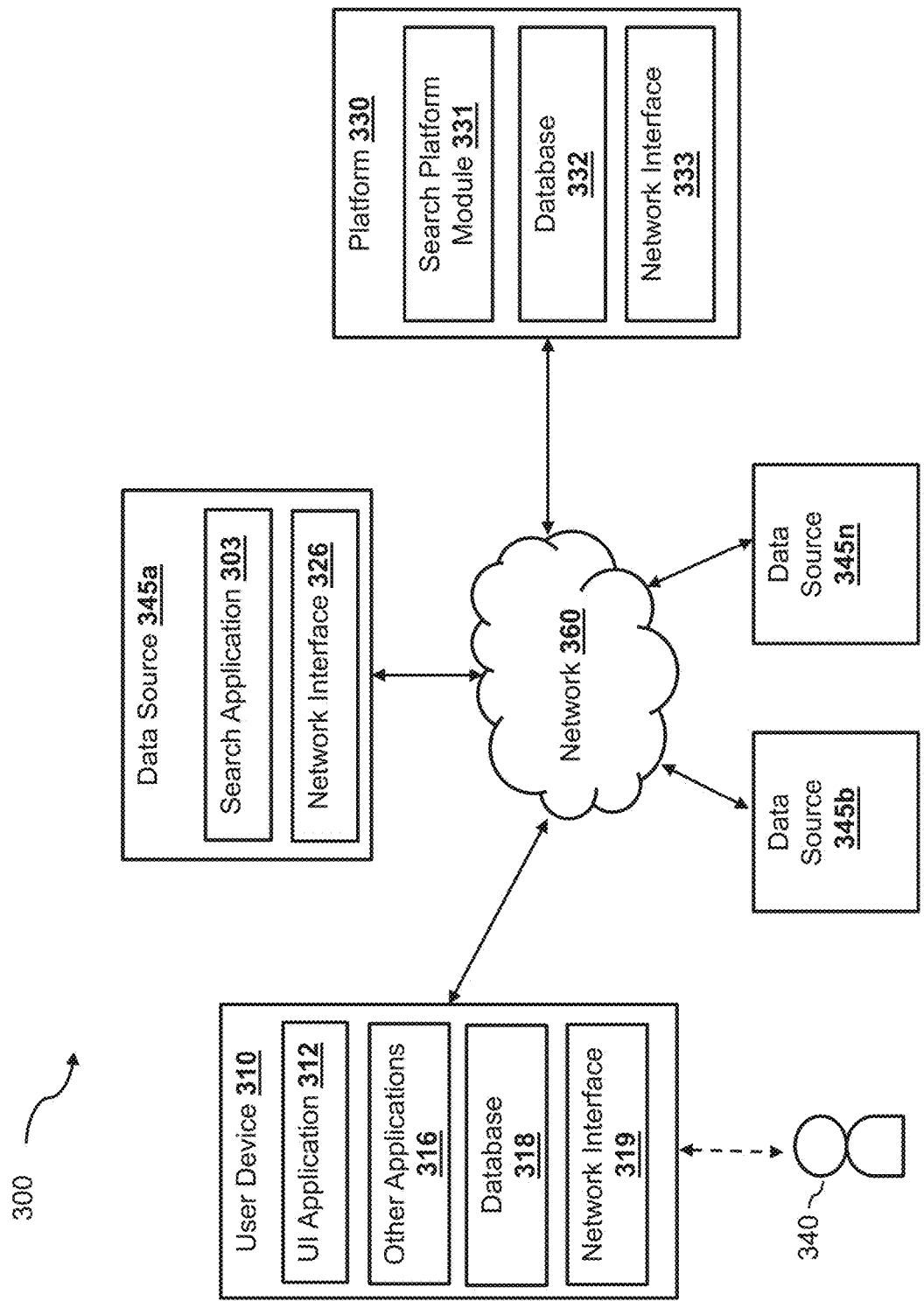
FIG. 3 is a simplified block diagram of a networked system suitable for implementing the search framework described in FIGS. 1-2 and other embodiments described herein.
Figure 5:
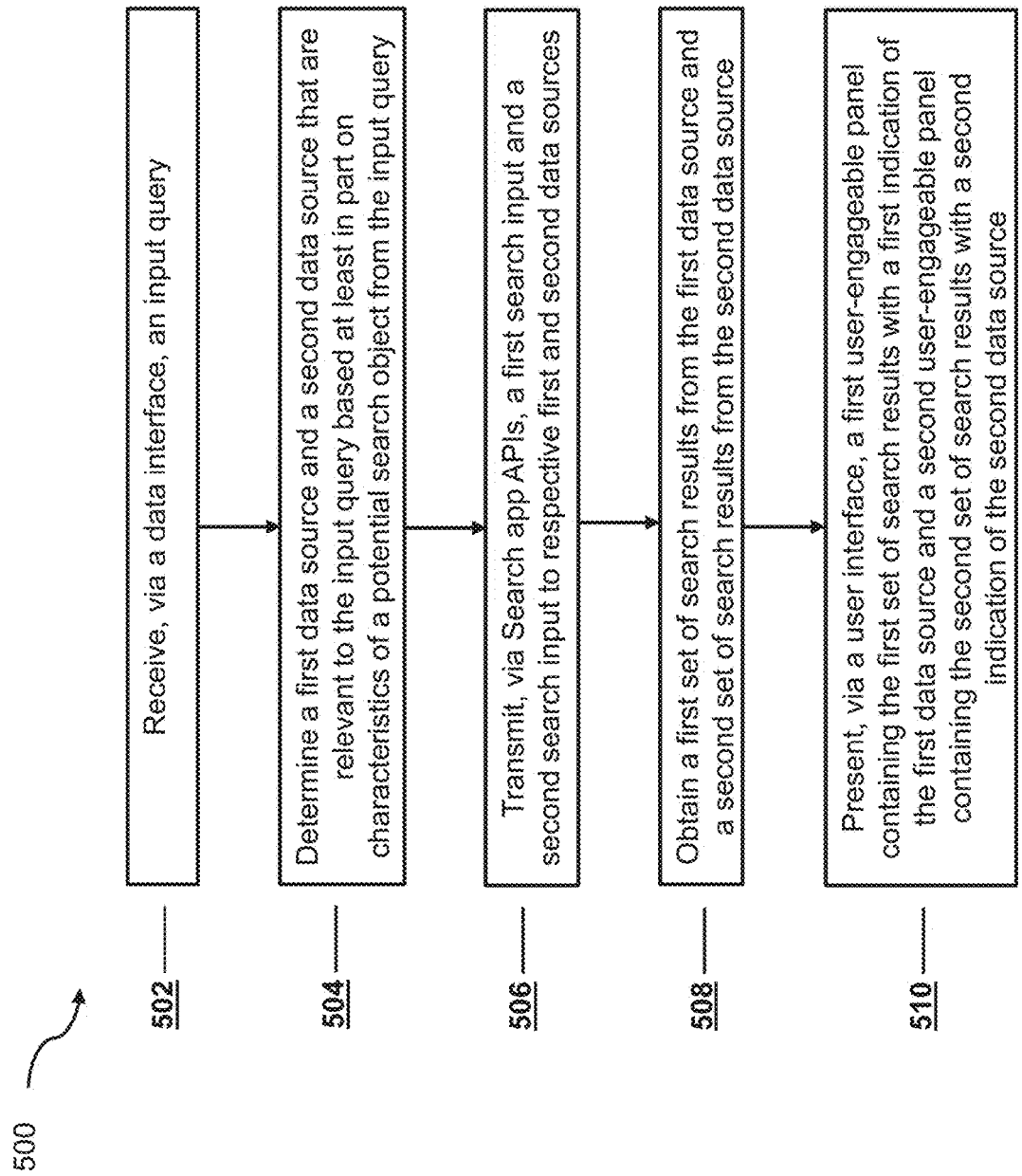
FIG. 5 is an example logic flow diagram illustrating a method of search based on the framework shown in FIGS. 1-4A, according to some embodiments described herein.
Figure 6:
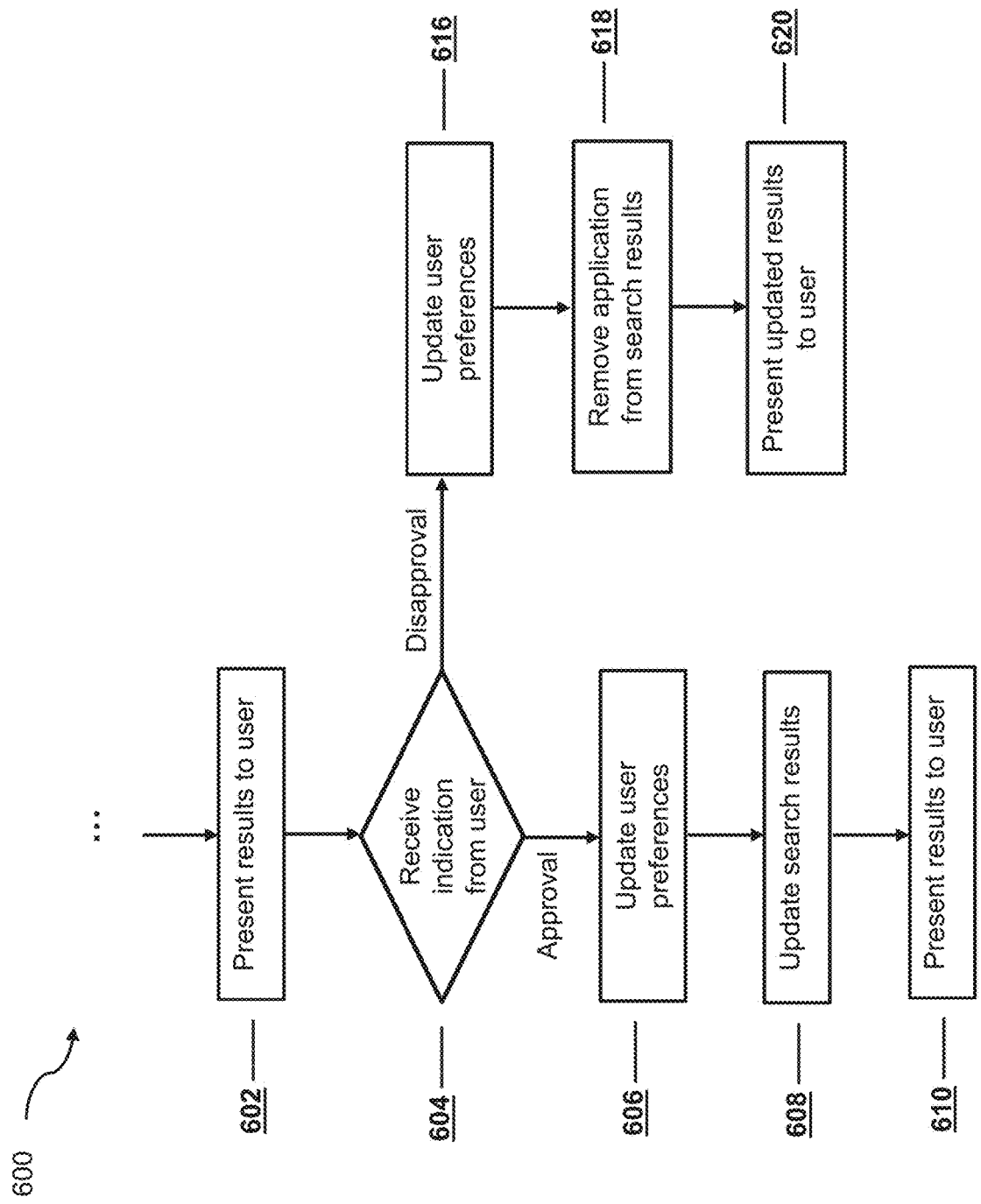
FIG. 6 is an example logic flow diagram illustrating a method of customized search based on the framework shown in FIGS. 1-4A, according to some embodiments described herein.

FIG. 3 is a simplified block diagram of a networked system suitable for implementing the customized search platform framework described in FIGS. 5-6 and other embodiments described herein. In one embodiment, block diagram 300 shows a system including the user device 310 which may be operated by user 340, data sources 345a and 354b-345n, platform 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data sources 345a and 354b-345n, and the platform 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data sources 345a and 354b-345n, and the platform 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data source 345 and/or the platform 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive search results in the form of user-engageable elements from the platform 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate APIs over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view and interact with user-engageable elements displaying search results.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 319 adapted to communicate with data sources 345a and 354b-345n and/or the server 330. In various embodiments, network interface component 319 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data sources 345a and 354b-345n may correspond to a server that hosts one or more of the search applications 303a-n (or collectively referred to as 303) to provide search results including webpages, posts, or other online content hosted by data sources 345a and 354b-345n to the server 330. The search application 303 may be implemented by one or more relational database, distributed databases, cloud databases, and/or the like. Search application 303 may be configured by platform 330, by data source 345, or by some other party. In some embodiments, In one embodiment, the platform 330 may allow various data sources 345a and 354b-345n to partner with the platform 330 as a new data source. The search system provides an Application programming interface (API) for each data sources 345a and 354b-345n to plug into the service the search system. For example, the California Bar Association may register with the search system as a data source. In this way, the data source "California Bar Association" may appear amongst the available data source list on the search system. A user may select or deselect California Bar Association as a preferred data source for their search. In similar manners, additional data sources 345 may partner with the platform 330 to provide additional data sources for the search such that the user can understand where the search results are gathered.

The data source 345a-n (collectively referred to as 345) includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data source 345 may send asset information from the search application 303, via the network interface 326, to the server 330.

The platform 330 may be housed with the search platform module 230 and its submodules described in FIG. 2. In some implementations, platform 330 may receive data from search application 303 and/or network interface 326 at the data source 345 via the network 360 to generate user-engageable elements displaying search results. The generated user-engageable elements may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the search platform model 230. In one implementation, the database 3232 may store user input queries, user profile information, search application information, search API information, or other information related to a search being performed or a search previously performed.

In some embodiments, database 332 may be local to the platform 330. However, in other embodiments, database 332 may be external to the platform 330 and accessible by the platform 330, including cloud storage systems and/or databases that are accessible over network 360.

The platform 330 includes at least one network interface component 333 adapted to communicate with user device 310 and/or data sources 345a and 354b-345n over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Architecture

Figure 4A:
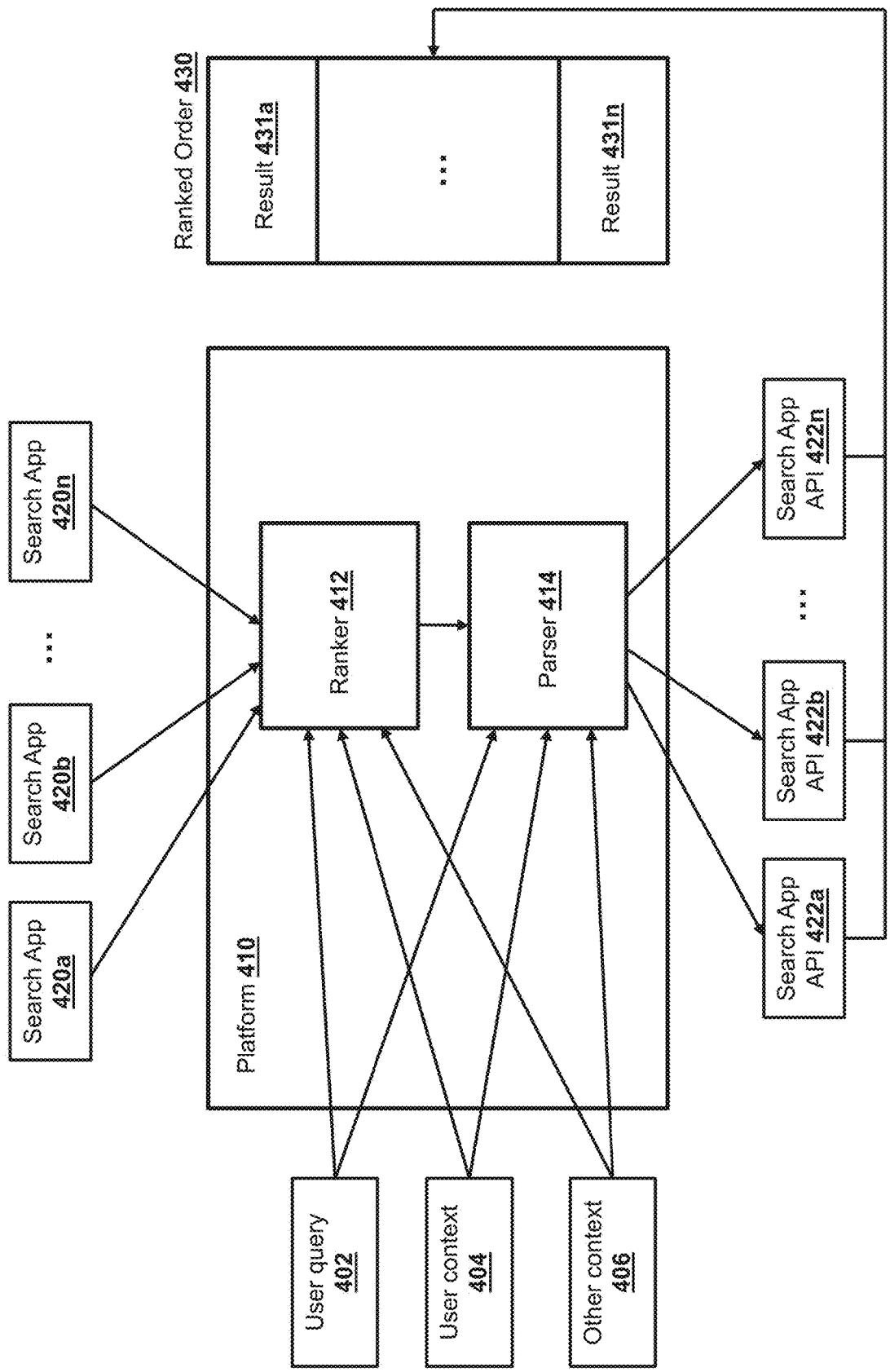
FIG. 4A is a simplified block diagram of a networked system suitable for implementing the customized search platform framework described in FIGS. 1-3 and other embodiments described herein.

FIG. 4A is a simplified block diagram of a networked system suitable for implementing the customized search platform framework described in FIGS. 1-3 and other embodiments described herein.

Platform 410 (which is similar to 230 in FIG. 2 or 330 in FIG. 3) receives input data from a user. This input data may include one or more of a user query 402, user context 404, and other context 406. User query 402 may include a word, multiple words, a sentence, or any other type of search query provided by a user performing a search using platform 410. For example, the user query 402 may be a search term such as "quasi recurrent neural network," "Richard Socher," etc. User context 404 may include inputs representative of the user, including a user ID, user preferences, user click logs, or other information collected or provided by the user, user selected preferred data sources, user past activities "like" or "dislike" a search result or a search source, and/or the like. Other context 406 may include inputs representative of other useful input information, including information about world events, searches that have been conducted around the same time, searches that have been conducted around the same area, searches that increased in volume over a period of time, or other potential contextual information that may assist platform 410 in providing appropriate search results to the user.

User query 402 may be converted, via platform 410, to a representative string $q=(q_1, \ldots, q_r)$ where each q is a single token in the string tokenized by some tokenization strategy. User context 404 and other context 406 may similarly be converted, via platform 410, to representative strings $u=(u_1, \ldots, u_m)$ (e.g., user context 404) and $c=(c_1, \ldots, c_p)$ (e.g., other context 406). A permutation of these inputs are concatenated into a single input sentence, e.g., the combined input sequence s=[TASK, q, SEP, u, SEP, c]. This combined input sequence is the entirety of representative string q, followed by representative string u, followed by representative string c, with special reserved tokens (TASK and SEP) used to inform the system of where one sequence ends and another begins.

The single input sentence is then provided to parser 414 (e.g., similar to parser submodule 231 in FIG. 2) and ranker 412 (e.g., similar to ranker submodule 233 in FIG. 2). Each of the ranker 412 and the parser 414 may be built on a neural network.

Specifically, ranker 414 determines and ranks a list of search apps 420-420n to conduct the search. In some embodiments, each search applications 420a-420n corresponds to a particular data sources 103a-n in FIG. 1, or one of 345a-345n, as shown in FIG. 3. For example, search app 420a corresponds to a search application that is configured to search within the database of Amazon.com; search app 420b corresponds to a search application that is configured to search within the database of Facebook.com, and/or the like. Ranker 414 uses the input sequence including user query 402, user context 404, and other context 406 to score the plurality of search apps 420a-420n, by running the input sequence through a neural network model once for each search app 420a-420n, as described in further detail below with respect to FIG. 4B. In this way, ranker 414 ranks a list of search apps corresponding to a list of data sources to conduct the user query 402. For example, for a user query 402 search for "affordable instant pot", search app 420a corresponding to Amazon.com may be prioritized over search app 420b corresponding to Facebook.com.

After the ranker 412 determines and ranks a list of search apps 420a-n for a particular user query 402, the parser 414 determines a respective specific search input for each search app API 422a-n that corresponds to each search apps 420a-n, respectively. Parser 414 may use the input sequence including user query 402, user context 404, and other context 406 to determine which tokens in a user query correspond to which inputs of search app APIs 422a-422n, as described further below with respect to FIG. 4C.

For example, Ranker 412 utilizes the combined input sequence s for each search application 420a-420n, where s is additionally concatenated with a representation of the search application 420 such that $s_{a_i}=[s,$ search application $420i]$.

Both ranker 412 and parser 414 make use of a variant of Transformer, where a sequence containing n tokens is embedded as a sequence of n vectors in $\mathbb{R}^d$. Each vector is the sum of a learned token embedding and a sinusoidal positional embedding. The sequence of vectors is stacked into a matrix $X_0 \in \mathbb{R}^{n \times d}$ and processed by l attention layers. The ith layer consists of two blocks, each preserving model dimension d. The first block uses multi-head attention with k heads.

$$\text{Attention}(X, Y, Z) = \text{softmax}\left(\frac{\text{mask}(XY^T)}{\sqrt{d}}\right)Z$$

$$\text{MultiHead}(X, k) = [h_1; \ldots ; h_k]W_O$$

where $h_j = \text{Attention}(XW_j^1, XW_j^2, XW_j^3)$

The second block uses a feedforward network with ReLU activation that projects inputs to an inner dimension f. This operation is parameterized by $U \in \mathbb{R}^{f \times d}$ and $V \in \mathbb{R}^{f \times d}$:

$$FF(X) = \max(0, XU)V$$

Each block precedes core functionality with layer normalization and follows it with a residual connection. Together, they yield $X_{i+1}$:

Block1: $\overline{X} = \text{LayerNorm}(X_i)$ $H_i = \text{MultiHead}(\overline{X}_i) + \overline{X}_i$ Block2: $\overline{H}_i = \text{LayerNorm}(H_i)$ $X_{i+1} = FF(\overline{H}_i) + \overline{H}_i$ The final output of the Transformer for a single input sequence x is then $X_l$. For example, the ranker 412 may pass an output matrix after l layers of attentions, which represents ranking information of the search apps 420a-n, to the parser 414. The parser 414 may output the matrix $X_l$ comprising search inputs for the search apps 420a-n, which are sent to the search app APIs 422a-n, respectively.

The returned search results via the search app APIs 422a-422n are then sorted according to the ranking generated by the ranker 412 and presented in ranked order 430. For example, result 431a corresponds to a group of search results from highest ranked search app 420a, and result 431n corresponds to search results from the lowest ranked search apps 420n. The results 431a-431n are then presented to the user via a graphical user interface or some other type of user output device. For example, search results 431a-431n may grouped and presented in the form of a list of user-engageable elements, each displaying an icon representing each respective search app (data source). Upon user selection of the icon, a list of search results from the respective search app may be presented to the user. Example UI diagrams can be found in FIGS. 8A-8K.

Therefore, by employing a neural-network based ranker 412 and parser 414, the search platform may intelligently predict which data sources are likely to be prioritized for a particular user based on the user query 402 and user context 404. For example, a user may directly configure a preference or dislike of a data source (e.g., see FIG. 8H, 8J). The search platform may thus include or exclude search apps corresponding to the preferred or disliked data sources in the search (e.g., as filtered by the ranker 412) accordingly. For another example, when a user dislikes a search post from Twitter.com, the search platform may not exclude Twitter.com from future search. However, if the user constantly dislikes search results from Twitter.com (e.g., more than a pre-defined times per day, per week, per percentage of total searches, etc.), the search platform may more likely deprioritize or exclude Twitter.com from future search. The neural model of the ranker 412 may be trained predict whether Twitter.com should be excluded or de-prioritized based on past user behaviors.

For example, the ranker 412 and the parser 414 may each be trained individually. A training input may comprise similar data such as the user query 402, user context 404 and other context 406. The ranker 412 is to generate a training output of a ranking of search apps (data sources), which are compared with the actual ground-truth ranking paired with the training input. A cross-entropy loss may be computed to update the ranker 412 via backpropagation. The parser 414 may be trained in a similar manner. For another example, the ranker 412 and the parser 414 may be trained jointly end-to-end.

These embodiments describe a system and method for a customized search platform that provides users control and transparency in their searches. In some instances, a user may prefer complete privacy when it comes to their searches and/or internet browsing. In such instances, a user may opt to remain in a "private mode" during searching. In other instances, a user may prefer results that are tailored to the user's preferences or interests. In such instances, a user may opt to instead enter a "personal mode."

A user may opt to remain in a "private mode" during searching. In "private mode," the computer system does not store queries on its servers, record clicks or any other interactions with the search engine, and disables all apps that require IP address or location, in order to protect user privacy. In a "private mode" embodiment, a user is able to perform searches with control over how the search engine collects and uses information about the user. Thus, in a "private mode" embodiment, platform 410 may collect input from a user query 402 and other context 406, but may not have access to user context 404 in performing each search. In addition, user query 402 will not be retained by platform 410 beyond the need to perform an immediate search using the user query 402.

In "personal mode," a user can instead further customize their experience during searching to retain control of the searching while enjoying results tailored specifically to the user. A user can optionally create a user profile to retain and store preferences. In a "personal mode" embodiment, a user is able to control their own search experience through information they provide to the search system. For instance, a user can select preferred data sources, and can modify the order in which applications appear in response to a search query. User interactions may optionally be collected and used to provide better tailored results for the user in the future, but "personal mode" ensures that the user retains control of their search experience instead of SEO professionals or advertisers. Thus, in a "personal mode" embodiment, platform 410 may collect input including user query 402, user context 404, and other context 406. The user context 404 collected and utilized may be controlled by the user.

FIG. 4B is a simplified block diagram of ranker 412, as described with respect to FIG. 4A. Ranker 412 uses user query 402, user context 404, and other context 406 to score each search app 420a-420n. Accordingly, the ranker 412 is run once for each search app 420 being ranked.

Ranker 412 decides a ranked order 430 over the set of search apps 420 Si. Given the input sequence $s_{a_i}$ as described above with reference to FIG. 4A, ranker 412 runs a Transformer over the input sequence to get $$\{X_{l_{a_i}}\}$$

for each search app 420. Each input sequence $s_{a_i}$ is reduced to a single vector via a pooling mechanism (e.g., mean, maximum, minimum, convolutional, etc.) and multiplied by shared $W_b \in \mathbb{R}^{1 \times d}$ to get a score for that search app 420.

$$\text{score}(s_{a_i}) = w_b \text{Pool}(\text{LayerNorm}(X_{l_{a_i}}))$$

This process is repeated for each search app 420a-420n. The ranked order 430 is then determined by sorting these scores.

Figure 4C:
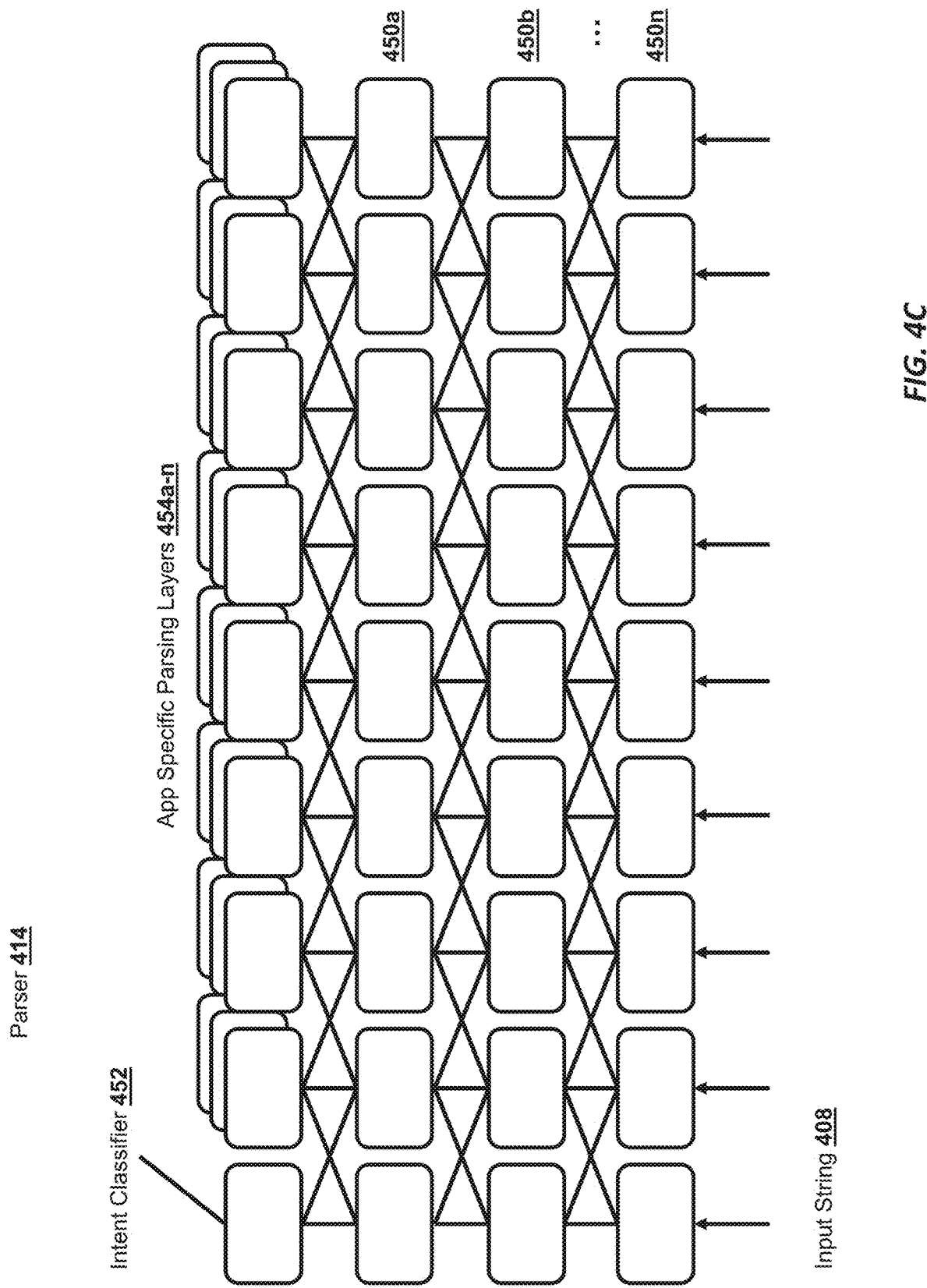
FIG. 4C is a simplified block diagram of the parser shown in FIG. 4A, as described with respect to FIG. 4A.

FIG. 4C is a simplified block diagram of parser 414, as described with respect to FIG. 4A. Parser 414 tags each input of x with a marker of whether it corresponds to an input of a search app API 422. Parser 414 operates on sequence x as described above, and computes the final output of the underlying Transformer architecture $X_l$. Instead of pooling and computing scores for each search app 420a-420n, parser 414 applies the following equation:

$$\text{SlotScores}_{a_i}(x) = \text{LayerNorm}(X_l) W_{a_i}$$

In the above equation, $\text{SlotScores}_{ai}$ determine for each toke in the input sequence x whether that toke corresponds to a particular input (or slot here to disambiguate from its own input) in the ith search app API 420, e.g., departure location, destination, etc. Each search app 420 has its own corresponding parameters $W_{a_i}$ with entries corresponding to each slot that needs to be tagged for computing scores over its slots.

Example Workflows

FIG. 5 is an example logic flow diagram illustrating a method of search based on the framework shown in FIGS. 1-4C, according to some embodiments described herein. One or more of the processes of method 500 may be implemented, at least in part, in the form of executable code stored on non-transitory, tangible, machine-readable media that when run by one or more processors may cause the one or more processors to perform one or more of the processes. In some embodiments, method 500 corresponds to the operation of the search platform module 230 (e.g., FIGS. 1-4A) that performs searches based on user inputs and provides user-engageable elements containing search results.

At step 502, an input query is received via a data interface. As shown in FIG. 4A, according to some embodiments, this input query may include one or more of user query 402, user context 404, or other context 406. In some embodiments, this input query is provided by a user through user interaction with the search system, such as by entering a search query into the search system.

In some embodiments, an input sequence may be generated by concatenating the input query (e.g., "Richard Socher," "Quasi Recurrent Neural Network," etc.) and a user context associated with a user who initiated the input query. The user context may include any combination of user profile information (e.g., user ID, user gender, user age, user location, zip code, device information, mobile application usage information, and/or the like), user configured preferences or dislikes of one or more data sources (e.g., as shown in FIG. 8H, 8J), and user past activities approving or disapproving a search result from a specific data source. In some embodiments, the input sequence further comprises supplemental context comprising contextual information from one or more data sources pertinent to the input query. This supplemental context may include indications of "popular search," "top search," "others are also searching . . . ," "hashtags," and other trending topics. The supplemental context may take into consideration global trends, local trends, news topics, or other relevant information based on current popularity. The supplemental context may also take into consideration searches of similar users, searches over a recent time period, searches from a geographic area, or other contextual information that may be pertinent to the input query. In some embodiments, a search input may be generated by a parsing neural model based on the input sequence.

At step 504, the search system determines a first data source and a second data source that are relevant to the input query based at least in part on characteristics of a potential search object from the input query. As shown in FIG. 4A, according to some embodiments, this determination of relevant data sources is performed using the input query, including user query 402, user context 404, or other context 406. In some embodiments, this determination of relevant data sources is based at least in part on characteristics of a potential search object from the input query. For instance, if the input query includes a name, such as "Richard Socher," relevant data sources may include "Twitter," "Facebook," "Instagram," "TikTok," or other social media websites. If the input query includes a food, such as "pumpkin pie," relevant data sources may include "All Recipes," "Food Network," or other food-related websites. If the input query is related to coding, such as an error in python, relevant data sources may include "StackOverflow," "Reddit," or other webpages or blogs oriented towards coding assistance.

In some embodiments, the determination of a first data source and a second data source that are relevant to the input query comprises generating an input sequence by concatenating the input query and a user context associated with a user who initiated the input query. A ranking neural model (e.g., see 412 in FIG. 4A) may then generate a relevance score for each data source based on the input sequence, and using the relevance score, determine whether each data source is relevant based on whether the respective relevance scores are greater than a threshold. Each data source may be ranked based on the respective relevance scores. In some embodiments, an indication may be generated by a parsing neural model for each data source.

At step 506, the search system may examine and filter the determined data sources based on stored user preferences of data sources, and generate/transmit search inputs customized for each data sources. In one implementation, if the user has previously selected a particular data source as a preferred data source, the search system may include and prioritize this particular data source. In one implementation, if the user has previously deselected or disapproved a particular data source, the search system may exclude this particular data source even if this data source may be determined as relevant at step 504.

In one implementation, the search system may universally apply user preferred data sources in the search. For example, if "Wikipedia" has been selected by the user as a preferred data source, the search system may always place a group of search results from "Wikipedia" in the search for the user.

In another implementation, the search system may categorize user preferred data sources based on its type. For example, if "LinkedIn" has been selected by the user as a preferred data source, the search system may store "LinkedIn" as a preferred data source for a specific type of query (e.g., relating to human names), and may not prioritize searches at "LinkedIn" when the query is irrelevant to a person's name (such as "high performance instant pot").

In alternative implementations, at step 506, the search system may transmit, via search application programming interfaces (APIs 422a-n in FIG. 4A), a first search input and a second search input to respective first and second data sources. The search inputs may be customized from the input query for each data source. Additional context may be received from each search app API relating to the input query from the data sources, and the additional context may be used to determine which portion of the input query corresponds to each search app API. For example, for a search app API with data source "LinkedIn.com," the search input may be customized as "Posts mentioning Richard Socher," "pages mentioning Richard Socher," users named "Richard Socher," stories mentioning "Richard Socher," hashtags, when the user input query is "Richard Socher."

At step 508, the search system obtains and/or generates a first set of search results from the first data source and a second set of search results from the second data source. These search results correspond to results 431a-431n as shown in FIG. 4A. Each set of search results is obtained and/or generated for a different search app 420a-420n, where each set of search results is ranked in a ranked order 430 as determined by ranker 412 and parser 414.

At step 510, the search system presents, via a user interface, a first user-engageable panel containing the first set of search results with a first indication of the first data source and a second user-engageable panel containing the second set of search results with a second indication of the second data source. These search results may be presented in user-engageable elements 700, as shown in FIG. 7 and FIGS. 8A-8K. Example UI diagrams can be found in FIGS. 8A-8K. Each set of search results generated at step 508 may be displayed in an additional user-engageable element at step 510, such that each set of search results 431a-431n (as shown in FIG. 4A) are generated and displayed to the user in corresponding user-engageable elements. In some embodiments, each user-engageable panel is presented in a ranked order according to the ranking determined in step 504.

FIG. 6 is an example logic flow diagram illustrating a method of customized search based on the framework shown in FIGS. 1-4C, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the search platform module 230 (e.g., FIGS. 1-4A) that performs searches based on user inputs and provides user-engageable elements containing search results.

At step 602, a set of one or more ranked results are presented to a user via user-engageable elements. These results may be determined, for example, as discussed above for FIG. 5. In some embodiments, each search app 420a-420n (e.g., FIG. 4A) that is ranked and parsed by platform 410 will be sorted and presented to the user via a ranked order. Each search app 420a-420n will have a corresponding user-engageable element that allows the user to interact with search results, the search app 420, At step 604, a user interacts with one or more of the search apps 420a-420n displaying results via the user-engageable elements, such as approval element 704 and disapproval element 706 shown in FIG. 7. For instance, in a search where the input query includes a food, such as "pumpkin pie," relevant data sources may include "All Recipes," "Food Network," or other food-related websites. The user may interact with the "All Recipes" approval element 704 in user-engageable element 700 to indicate a preference for the "All Recipes" source. The search system may then use this information to update user preferences to use the "All Recipes" source for other food-based input queries. The user may also interact with the "Food Network" disapproval element 706 in user-engageable element 700 to indicate a negative preference for the "Food Network" source. The search system may then use this information to update user preferences to avoid the "Food Network" source for other food-based input queries.

In some embodiments, when a user selection of an additional data source is received, a new search input is customized from the input query to the respective data source and transmitted via a search app API integrated at the server of the additional data source. A set of search results from the data source may be received and presented via a user-engageable panel displaying the search results, as discussed further above and below.

At steps 606/616, the user's preferences are updated based on the inputs provided. These user preferences may be included as user context 404 (e.g., FIG. 4A) to better tailor search results for the user. Following the example above, at step 606, this may involve updating the user's preferences to reflect an increased desire to see the "All Recipes" source. Meanwhile, at step 616, this may involve updating the user's preferences to reflect a decreased desire to see the "Food Network" source.

In some implementations, a user may directly configure a preference or dislike of a data source (e.g., see FIG. 8H, 8J). The search platform may thus include or exclude search apps corresponding to the preferred or disliked data sources in the search (e.g., as filtered by the ranker 412) accordingly. In some implementations, the search platform may apply rule-based criteria to filter data sources based on user past activities with respect to search results from a particular data source. For example, when a user dislikes a search post from Twitter.com, the search platform may not exclude Twitter.com from future search. However, if the user constantly dislikes search results from Twitter.com (e.g., more than a pre-defined times per day, per week, per percentage of total searches, etc.), the search platform may deprioritize or exclude Twitter.com from future search.

At steps 608/618, the search results are updated based on the user's interactions with the system. Following the example above, at step 608, this may involve increasing the ranked order 430 position for the result 431 corresponding to the "All Recipes" source (e.g., FIG. 4A). At step 616, this may involve decreasing the ranked order 430 position for the result corresponding to the "Food Network" source, or alternatively, may result in the removal entirely of the "Food Network" source from the results 431a-431n displayed to the user.

At steps 610/620, the updated results are presented to the user. These results may be presented to the user in ranked order 430, where each result 431a-431n is shown in a user-engageable element 700 as discussed in further detail below for FIG. 7.

In some embodiments, the user may instead interact with additional user-engageable elements to provide an indication regarding search apps 420 which are not included within the ranked order of search apps presented to the user. In such instances, the search system will update user preferences as discussed above for step 606. The search results may be updated in step 608 to increase the rank of the search app 420 or to add the search app 420 to the search results, if it was not already there, based on the input from the user-engageable element.

Figure 7:
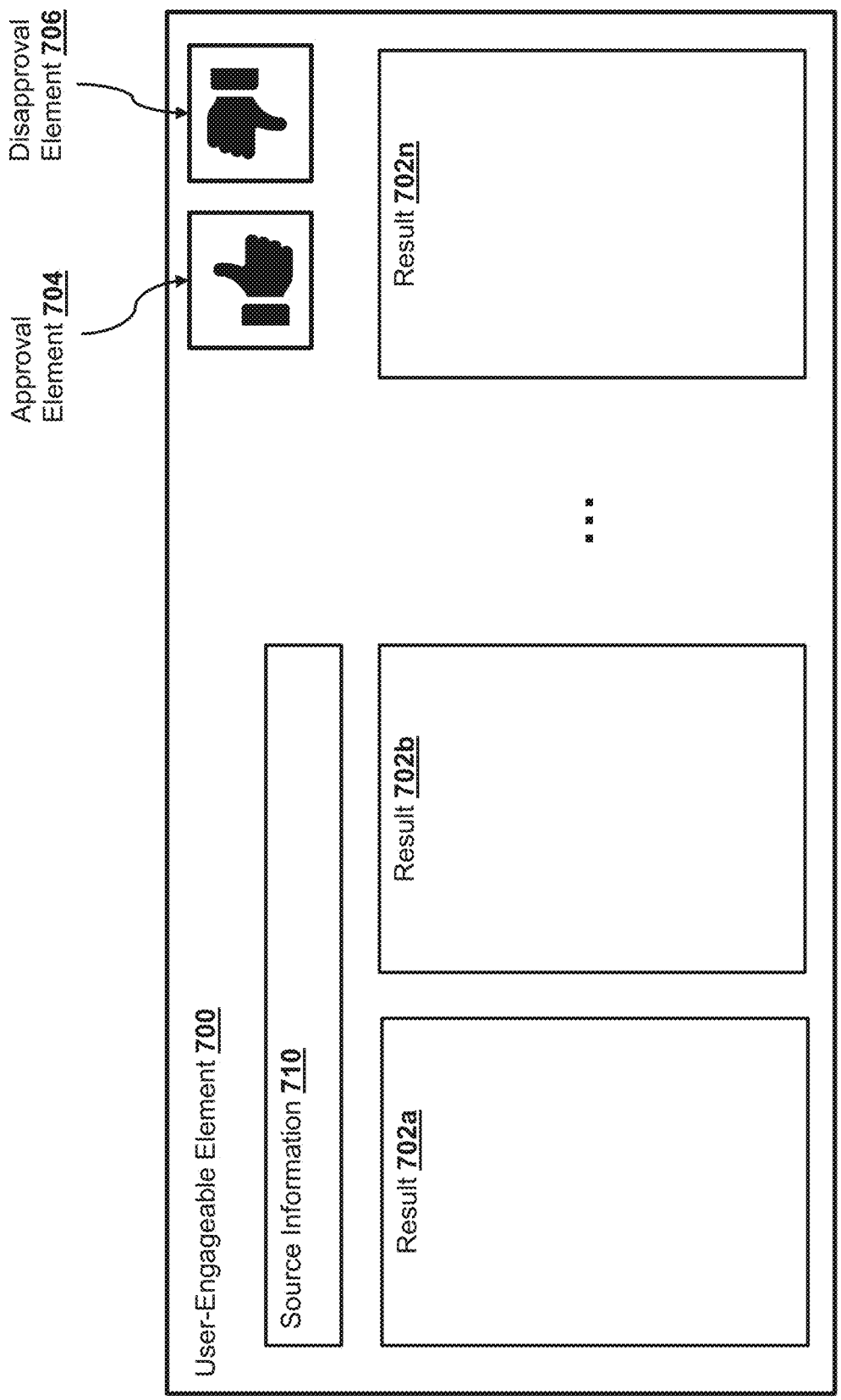
FIG. 7 is a simplified block diagram of an example search interface implementing the customized search platform framework described in FIGS. 5-6 and other embodiments described herein.

FIG. 7 is a simplified block diagram of an example search interface implementing the customized search platform framework described in FIGS. 5-6 and other embodiments described herein. FIG. 7 depicts user-engageable element 700, and one or more user-engageable elements 700 may be presented to a user via a user interface, where each user-engageable element contains sets of search results.

User-engageable element 700 may include source information 710 providing information to users with important or useful information on what source is providing the results 702a-702n shown in user-engageable element 700. For instance, this may be a website name to indicate that results 702a-702n are shown from a specific website related to the search input query. User-engageable element 700 corresponds to a single search app 420 as depicted in FIG. 4A, where the first user-engageable element 700 shown to a user is the first result in ranked order 430 (e.g., result 431a), and each subsequently shown user-engageable element 700 is the next result 431 in ranked order 430.

Each user-engageable element 700 may provide one or more results 702a-702n, which include web pages, social media posts, blog posts, recipes, videos, code segments, or other content relevant to a search query. Each result 702 may be user-engageable, and may allow the user to visit the web page, interact with the social media post directly, comment on blog posts, read and save recipes, watch videos, copy code, provide feedback, or otherwise interact with the content in each result 702. Each user-engageable element 700 may also provide users to indicate their preference for the data source, using approval element 704 and disapproval element 706, as discussed in further detail for FIG. 6 above.

FIGS. 8A-8K are exemplary search interfaces 800a-800k implementing the customized search platform framework described in FIGS. 5-6 and other embodiments described herein.

Figure 8A:
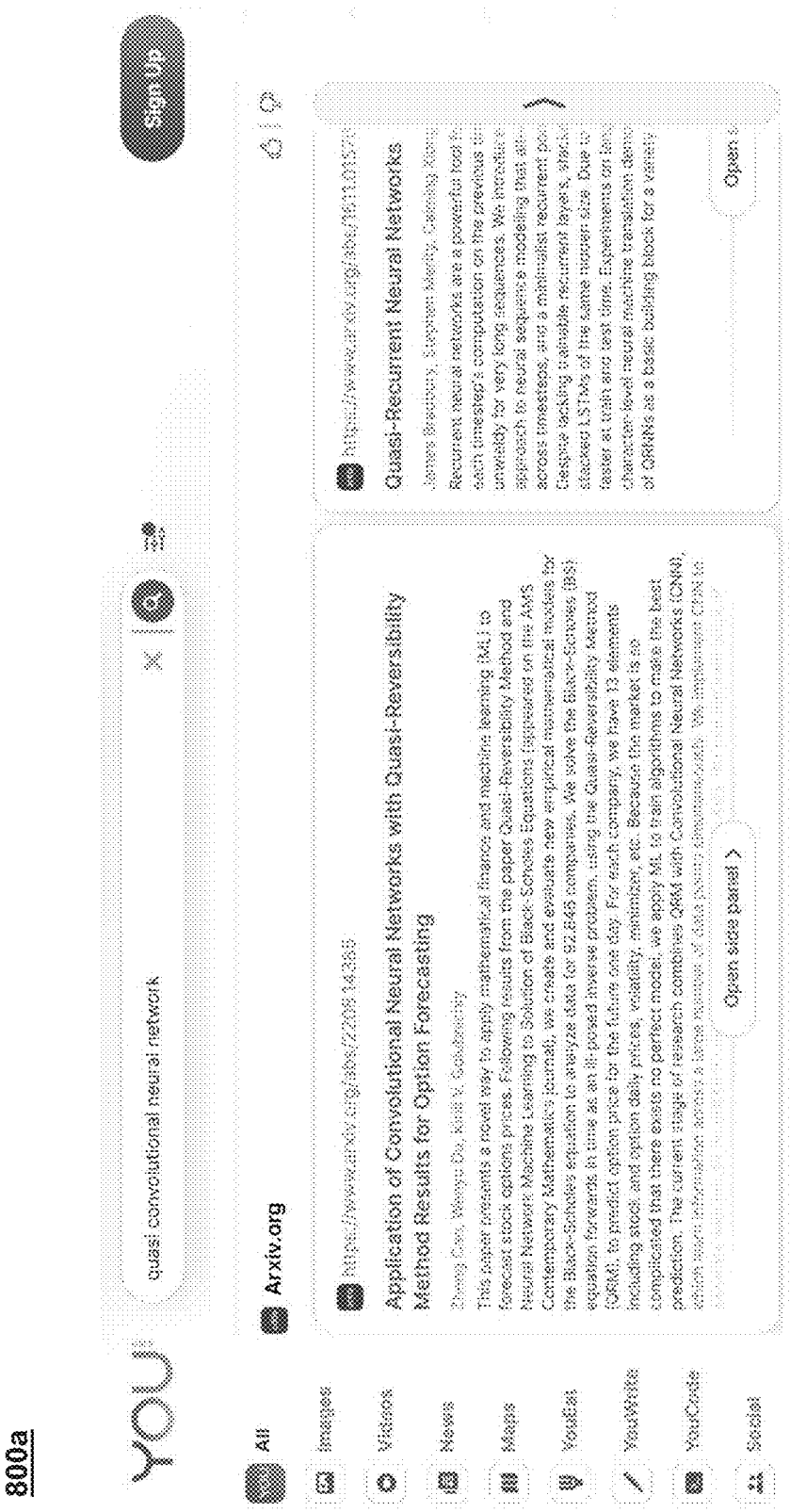
FIGS. 8A-8K are exemplary search interfaces implementing the customized search platform framework described in FIGS. 5-6 and other embodiments described herein.

As seen in FIG. 8A, a customized search platform framework is utilized to allow users the option to perform a search and select data sources of the search. A user may search for a query, such as "quasi convolutional neural network" and the customized search platform may determine that according to the characteristics of this user query (e.g., a name of a scientific term, etc.), the data source "arXiv" provides the most relevant results and prominently display the data source to the user along with a list of search results that are provided specifically from "arXiv." The search results from "Arxiv.org" are presented in a form of a slidable horizontal panel such that the user may engage with the panel to "slide" and view a list of results in panel.

Figure 8B:
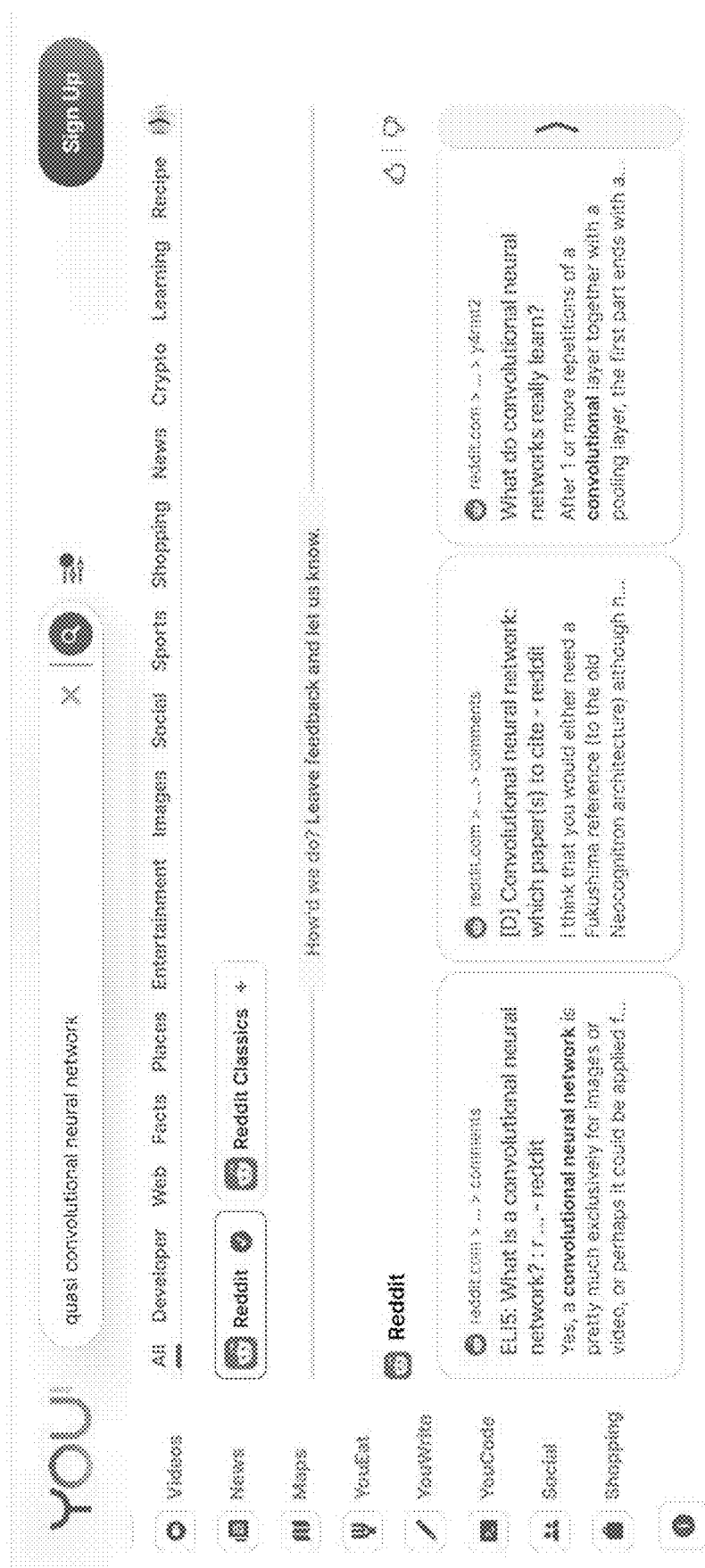

As seen in FIG. 8B, for the same search query "quasi convolutional neural network," the customized search platform may determine that "Reddit" is another relevant data source (e.g., search app) but may be ranked lower than "Arxiv.org." Thus, search results from "Reddit" may be presented in another slidable horizontal panel that is displayed below the panel for "Arxiv.org," such that the user may engage with the panel to "slide" and view a list of results in panel.

Figure 8C:
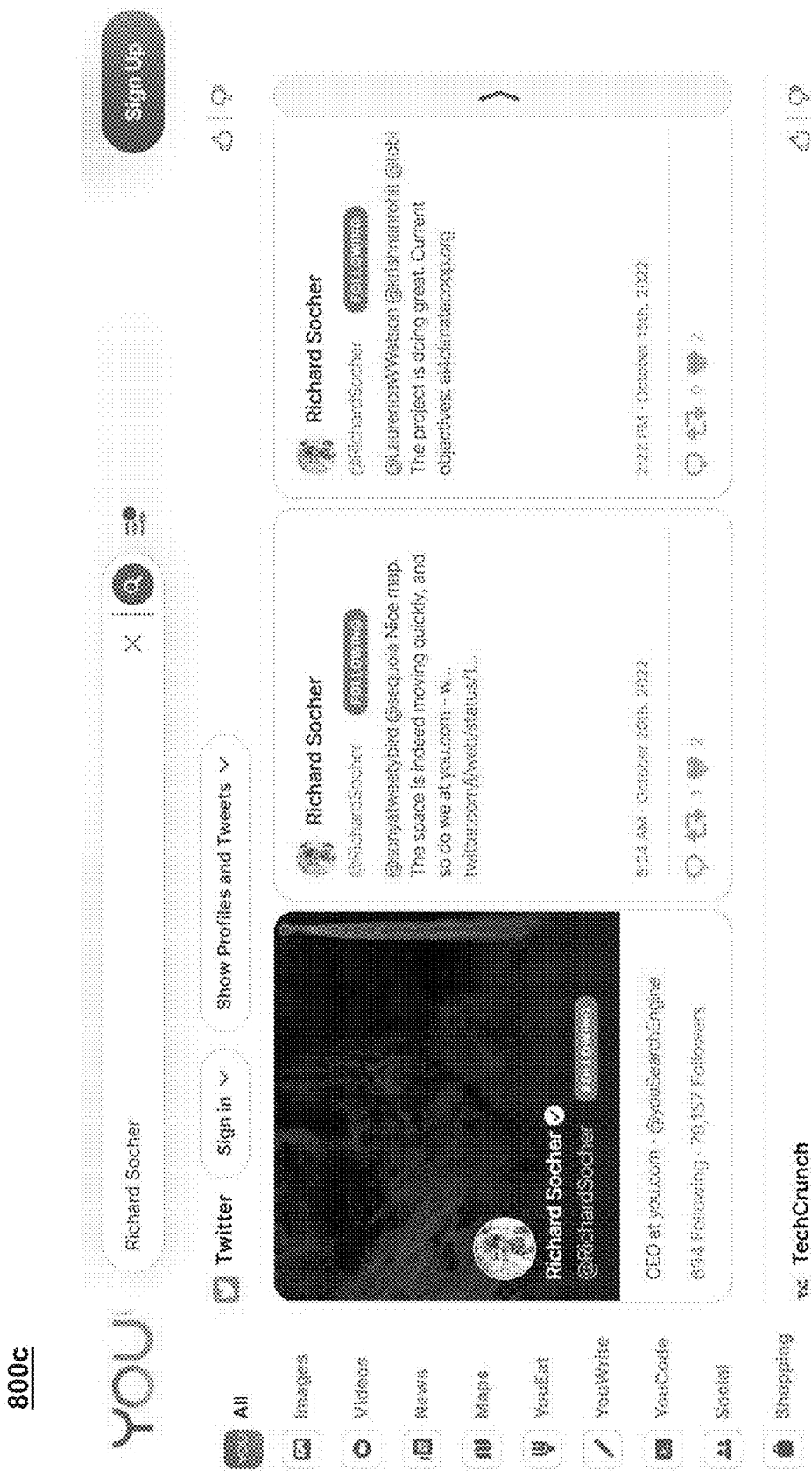

As seen in FIG. 8C, when the search query is "Richard Socher," the customized search platform may determine that according to the characteristics of this user query (e.g., a name of a human being, etc.), the data source from social media, such as "Twitter" provides the most relevant results and prominently display the data source to the user along with a list of search results that are provided specifically from "Twitter." The search results from "Twitter" are presented in a form of a slidable horizontal panel such that the user may engage with the panel to "slide" and view a list of Tweets from the user "Richard Socher" or mentioning "Richard Socher" in panel.

Figure 8D:
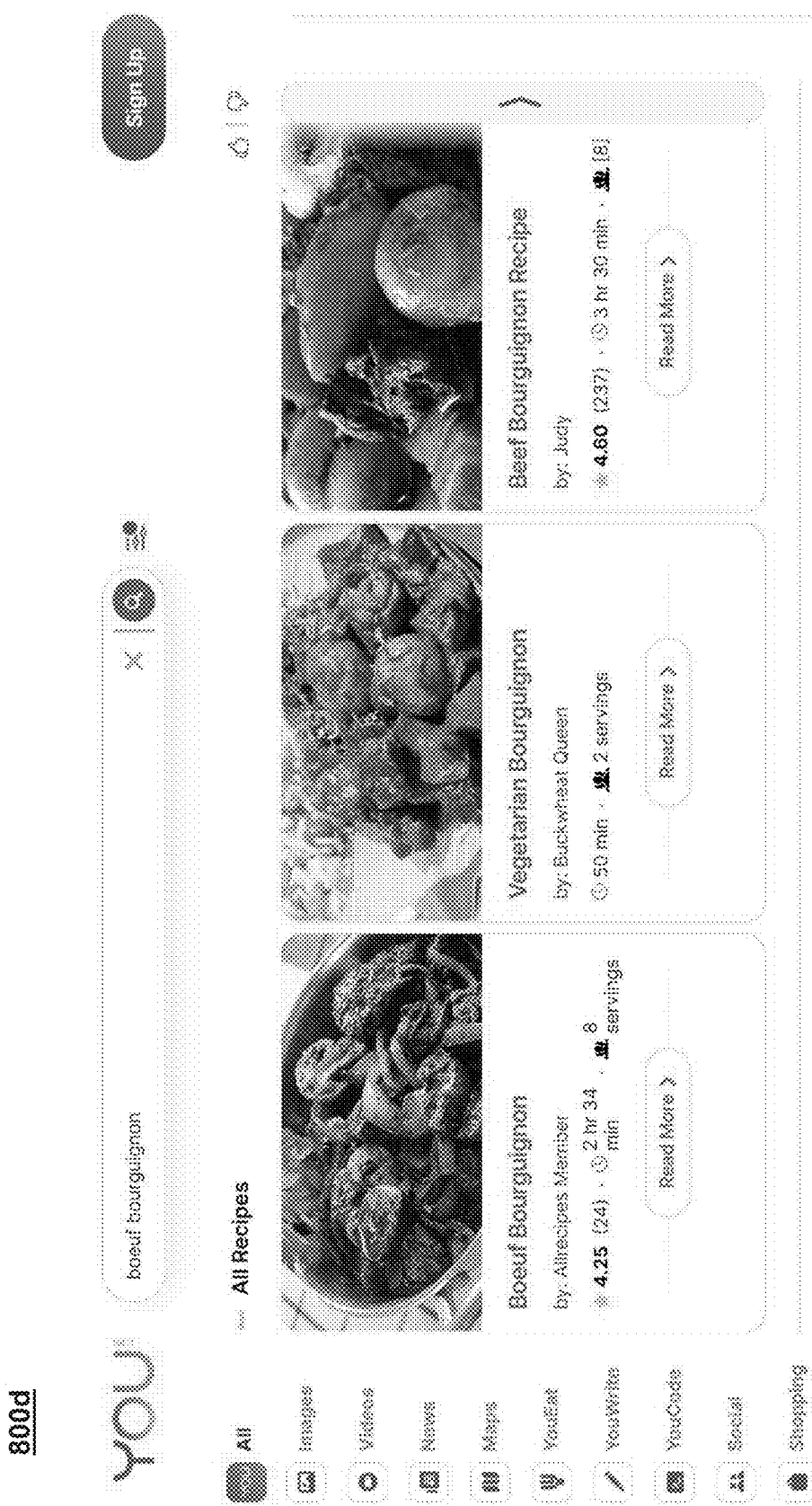
Figure 8E:
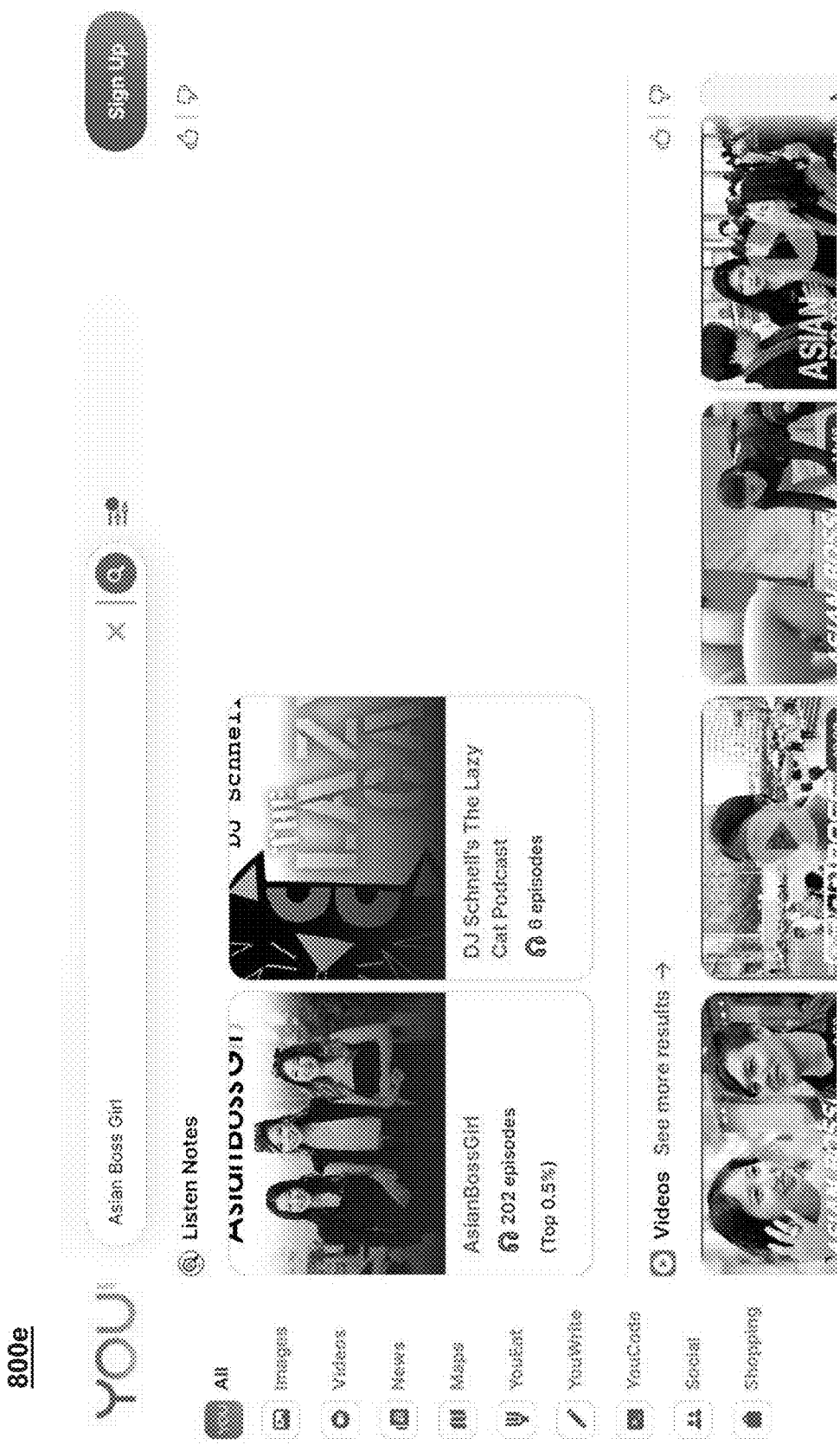

In another example as seen in FIG. 8D, if the user enters the query "Boeuf Bourguignon," the customized search platform may preliminarily determine that this search term relates to a food item, a dish, and/or a related term, and thus may recommend search results from a data source such as "Recipes.com" or "FoodNetwork."

In another example as seen in FIG. BE, if the user enters the query "Asian Boss Girl," the customized search platform may preliminarily determine that this search item is a trendy topic and may refer to the social media sensation. Therefore, the customized search platform may recommend search results from social media sources, such as "Instagram," "Pinterest," "YouTube," and/or other social media webpages.

Figure 8F:
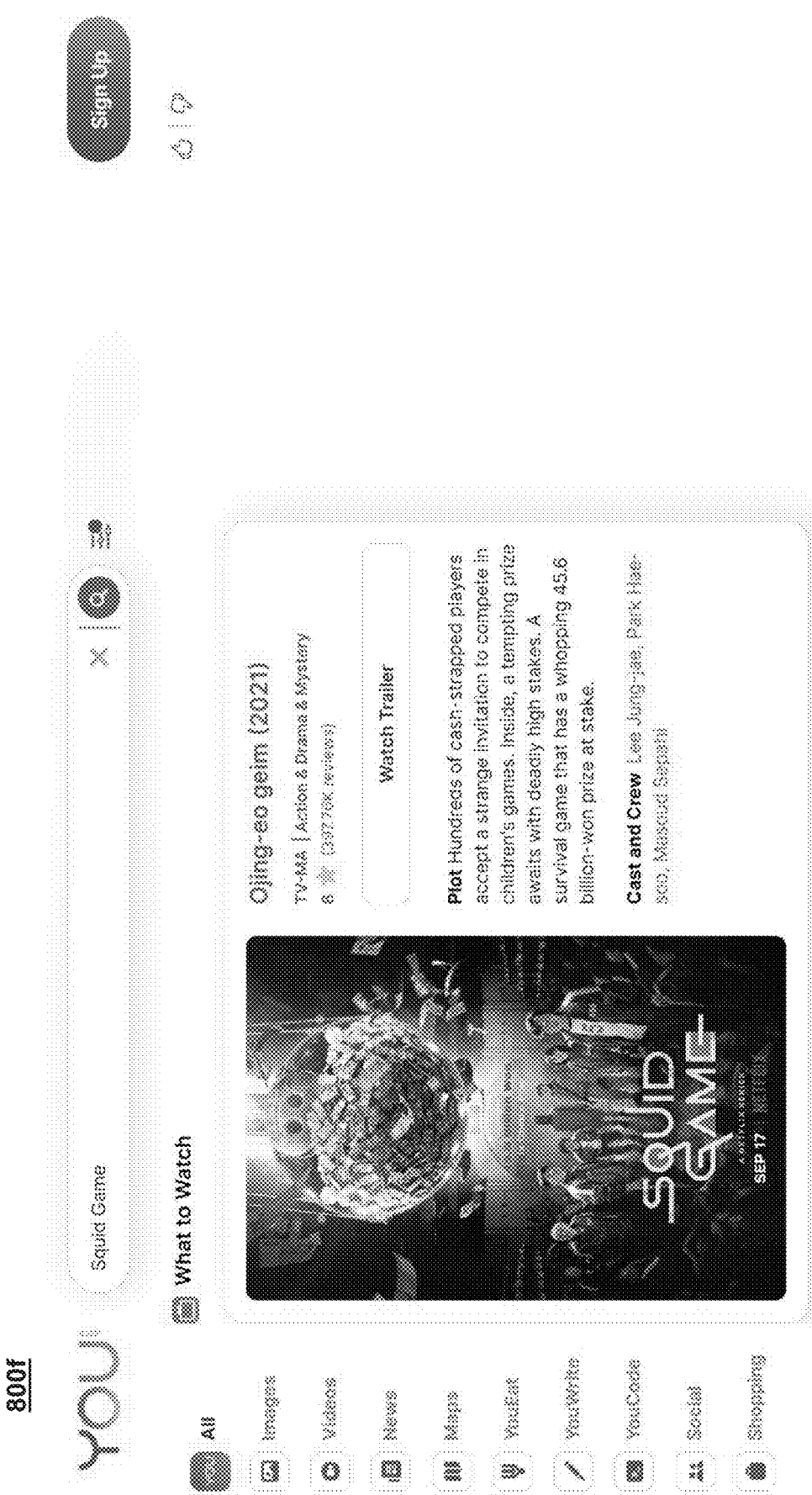

In another example as seen in FIG. 8F, if the user enters the query "Squid Game," the customized search platform may preliminarily determine that the search term relates to a media item. Therefore, the customized search platform may recommend search results from data sources providing media or details of the media item.

Figure 8G:
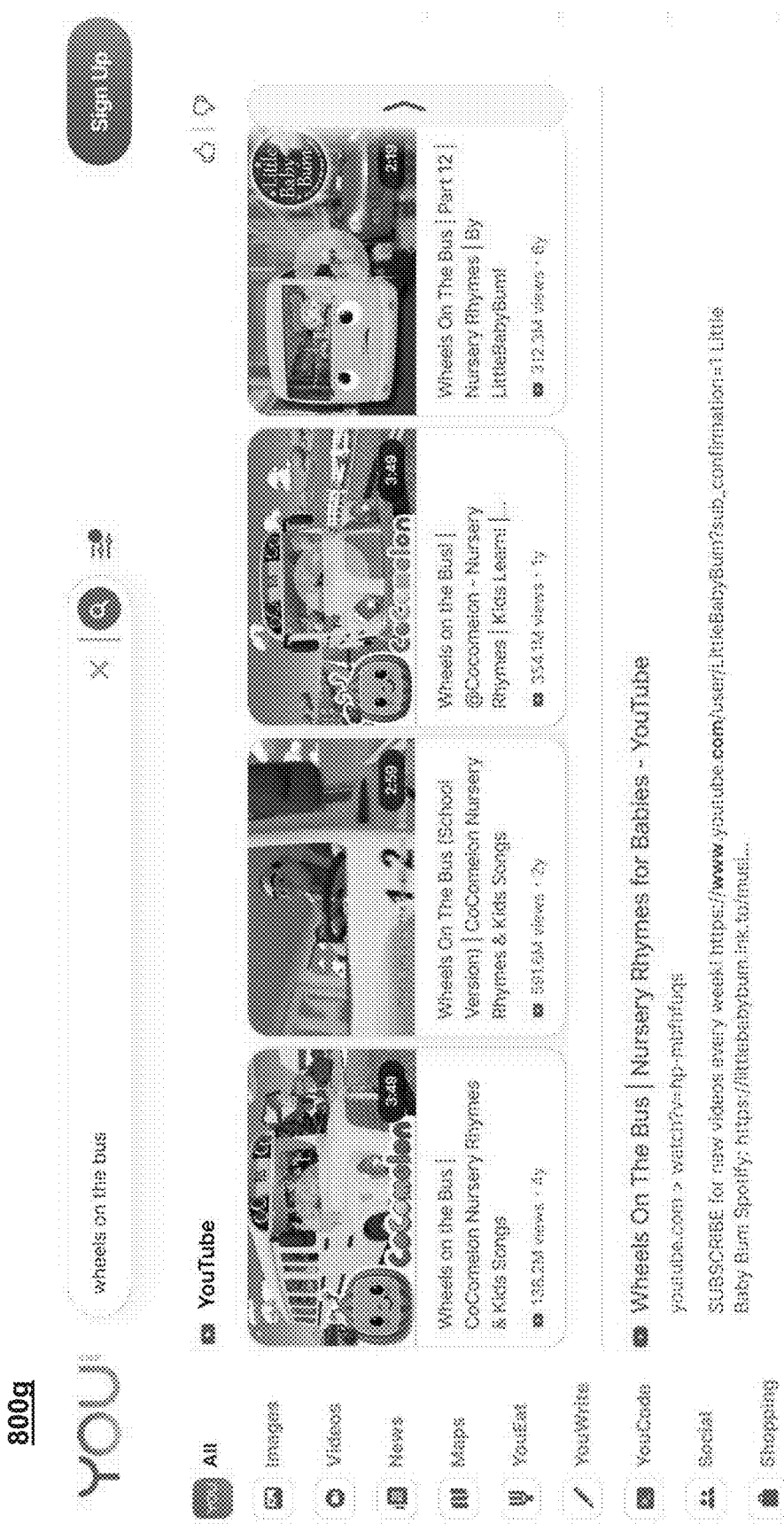
Figure 8H:
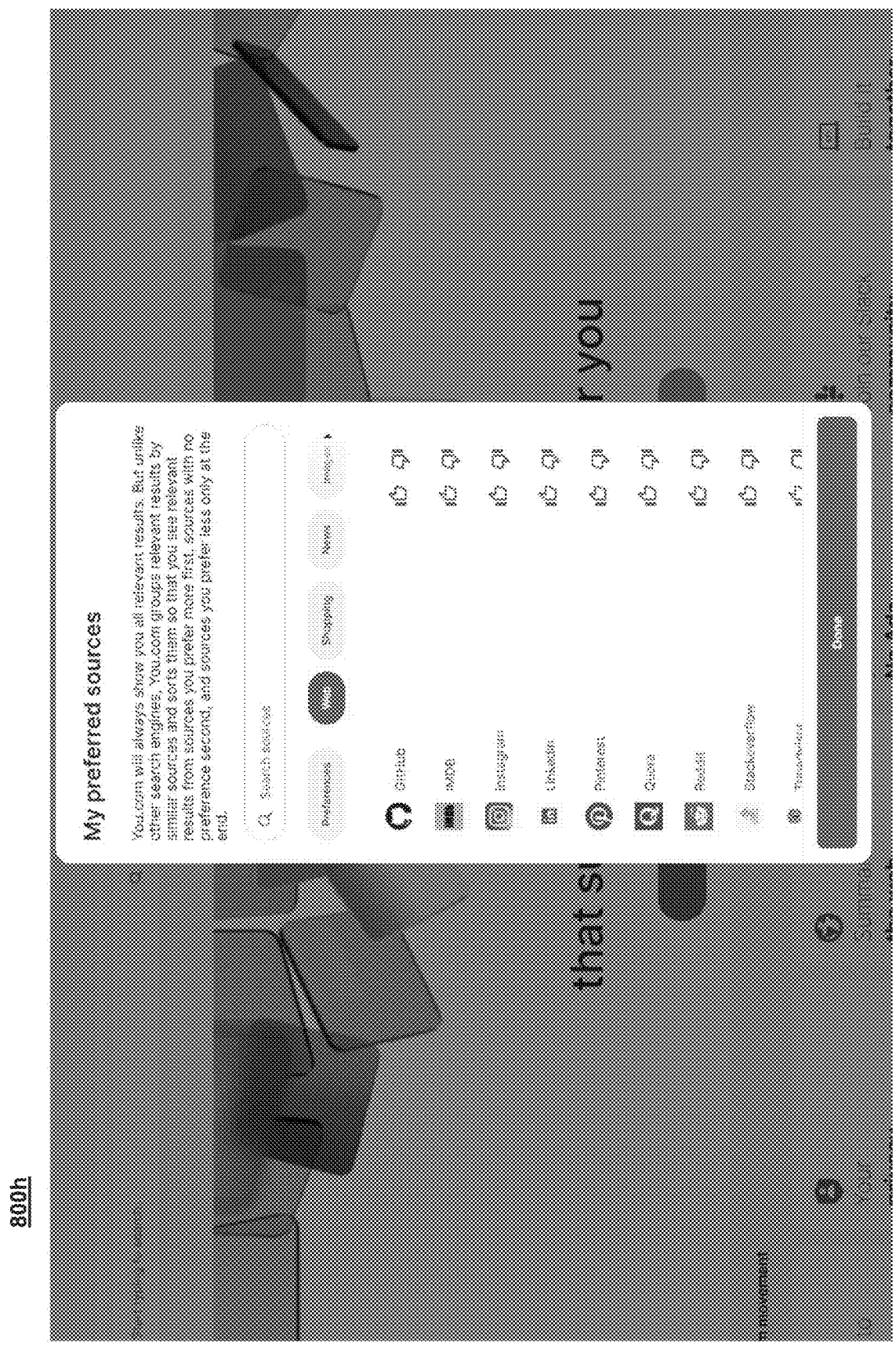

In another example as seen in FIG. 8G, if the user enters the query "wheels on the bus," the customized search platform may preliminarily determine that while the search term may be related to a media item, unlike the previous example of "Squid Game," the query "wheels on the bus" refers to an old-fashioned nursery. Therefore, the customized search platform may recommend search results from sources providing content aimed at the nursery rhyme, such as videos from "YouTube," "TikTok," or some other video source.

As seen in FIG. 8H, the customized search platform allows a user to customize their preferred data sources. A user may choose to submit whether they prefer or do not prefer a particular data source by clicking on an icon to show that preference or approval, such as a "thumbs up" or "thumbs down" icon. Based on the user submitted preferences, the customized search platform may rearrange and reprioritize search results. For example, if a user has elected "thumbs up" (e.g., approval) for "LinkedIn" but "thumbs down" (e.g., disapproval) for "Instagram," when a user searches for a person's name such as "Richard Socher," the customized search platform may prioritize results of "Richard Socher" from "LinkedIn" but may deprioritize the results from "Instagram."

Figure 8I:
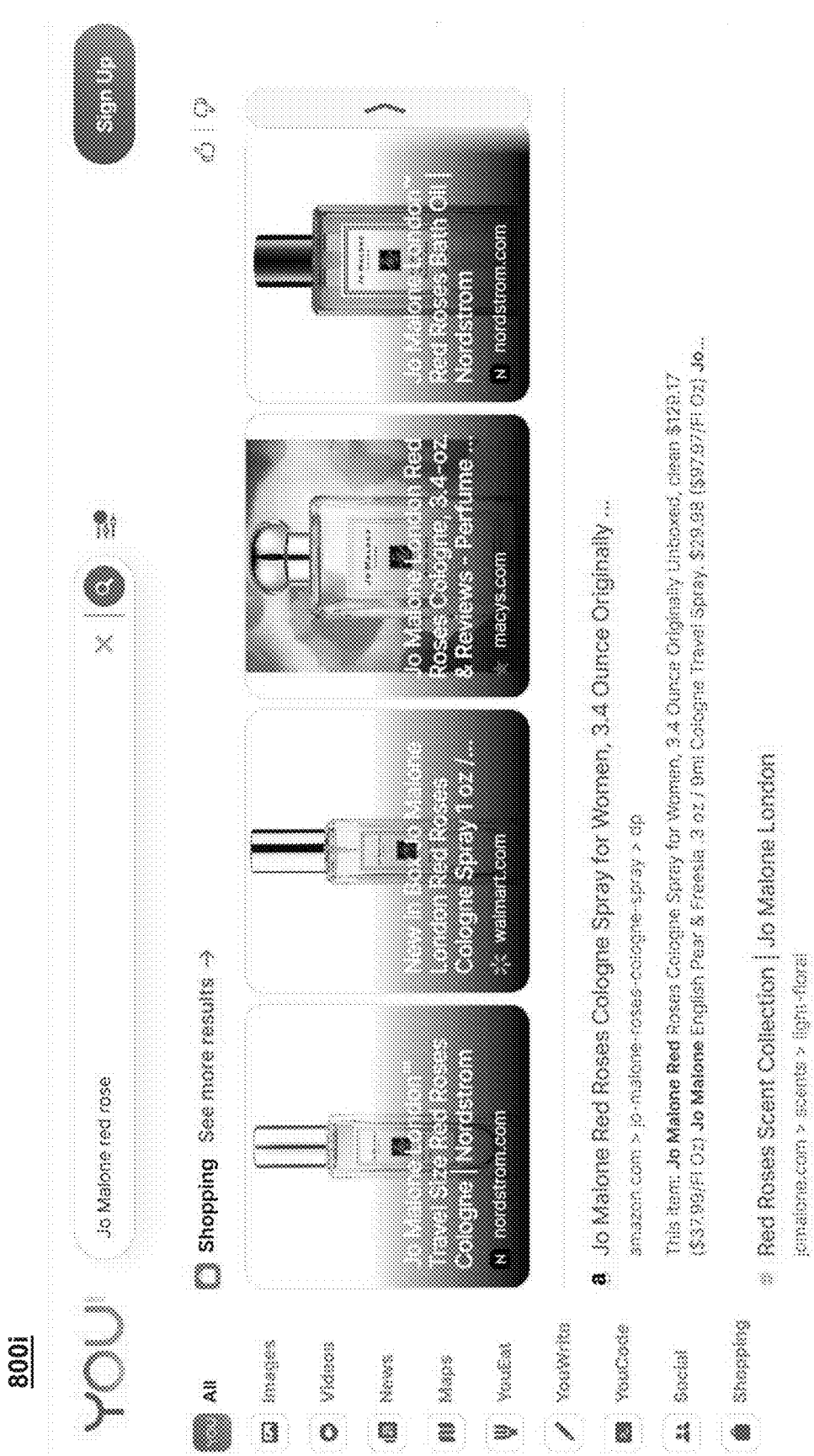
Figure 8J:
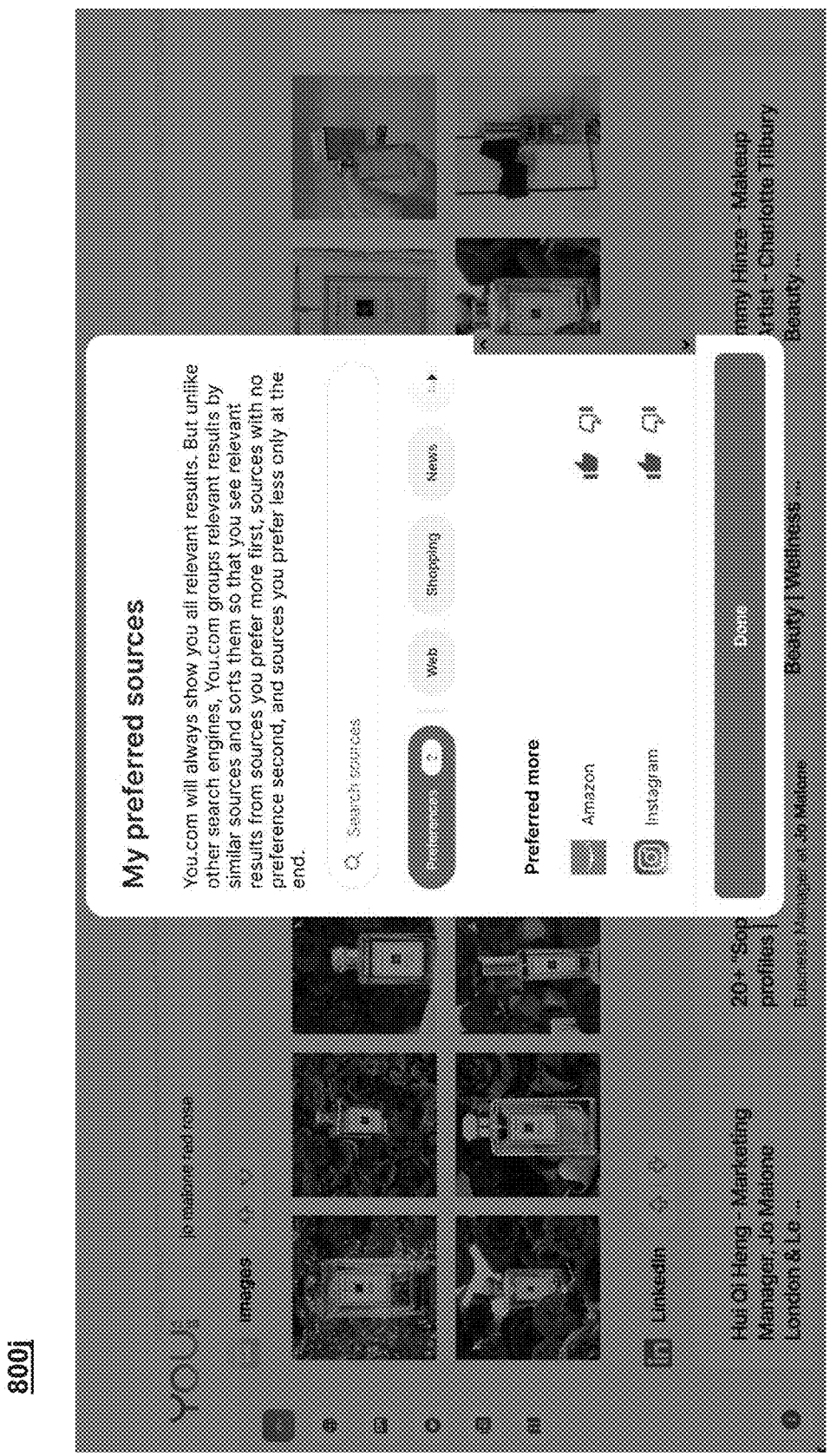
Figure 8K:
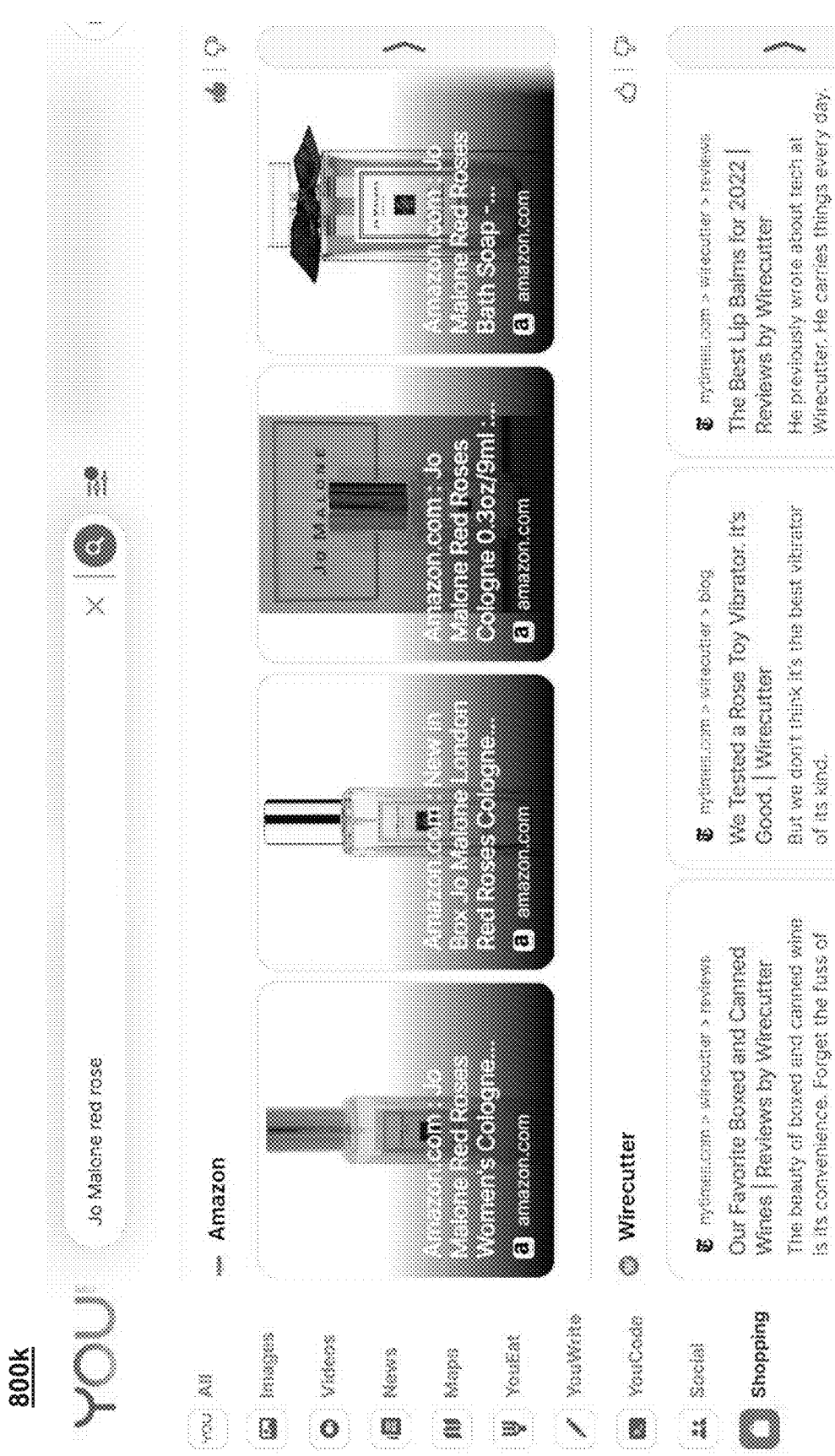

FIGS. 8I-8K show an example of a search being performed on the customized search platform before and after preferences are configured by a user. In FIG. 8I, a search is shown where a user initially enters a search query of "Jo Malone red roses," where the customized search platform may return any search results from different data sources, e.g., various shopping sites such as Nordstrom.com, Walmart.com, Macys.com, etc.

FIG. 8J shows one embodiment of how a user may configure their source preferences. In this example, the user has configured their source preferences by electing "Amazon" and "Instagram" as the preferred sources when the customized search platform performs searches.

In FIG. 8K, the search of FIG. 8I is repeated after the source preferences have been changed as seen in FIG. 8). After the user configuration of source preferences, the customized search platform may preliminarily determine that the search term "Jo Malone red rose" relates to a product related to shopping. Therefore, the customized search platform may prioritize search results from the shopping site "Amazon" as per the user's preferences.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of presenting a plurality of search results in response to a search query, the method comprising:
receiving, via a data interface, an input query for performing an Internet search;

determining, by a neural network implemented at a server, a first data source and a second data source at which a search is to be performed relating to the input query, based at least in part on characteristics of a potential search object from the input query and data source preferences configured by a user prior to the Internet search, wherein the data source preferences comprise at least one data source that the user deselects;

transmitting, via a first search application programming interface (API) integrated at the server, a first search input customized from the input query to the first data source;

transmitting, via a second search API integrated at the server, a second search input customized from the input query to the second data source without transmitting any search input to the at least one data source;

obtaining a first set of search results from a first search within the first data source and a second set of search results from a second search within the second data source without obtaining any search result from the at least one data source; and causing a display at a user interface, of a first user-engageable panel displaying the first set of search results with a first indication of the first data source and a second user-engageable panel displaying the second set of search results with a second indication of the second data source.

2. The method of claim 1, wherein the determining, by the neural network implemented at a server, a first data source and a second data source comprises:
generating an input sequence by concatenating the input query and a user context associated with a user who initiated the input query; and
generating, by a ranking neural model, a first relevance score for the first data source based on the input sequence and a second relevance score for the second data source; and
determining that the first data source and the second data source are relevant when the first relevance score and the second relevance score are greater than a threshold.

3. The method of claim 2, further comprising:
ranking the first data source and the second data source based on the first relevance score and the second relevance score.

4. The method of claim 2, further comprising:
generating, by a parsing neural model, the first search input or the second search input based on the input sequence, and an indication of the first data source or the second data source, respectively.

5. The method of claim 3, wherein the first user-engageable panel and the second user-engageable panel are presented in a ranked order according to the ranking.

6. The method of claim 1, further comprising:
receiving, via the data interface, a user selection of a third data source;
transmitting, via a third search API integrated at the server, a third search input customized from the input query to the third data source;
obtaining a third set of search results from the third data source; and
presenting, via the user interface, a third user-engageable panel displaying the third set of search results.

7. The method of claim 1, further comprising:
receiving, via the data interface, a user indication that disapproves the second data source; and
removing the second user-engageable panel from the user interface.

8. The method of claim 2, wherein the user context comprises any combination of:
user profile information;
user configured preferences or dislikes of one or more data sources; and
user past activities approving or disapproving a search result from a specific data source.

9. The method of claim 2, wherein the input sequence further comprises a supplemental context comprising contextual information from one or more data sources pertinent to the input query.

10. The method of claim 4, further comprising:
receiving, via the first search API or the second search API, additional context information relating to the input query from the first or the second sources; and
determining which portion of the input query corresponds to the first search input to the first search API or the second search input to the second search API.

11. A system of presenting a plurality of search results in response to a search query, the system comprising:
a communication interface that receives an input query for performing an Internet search;
a memory storing a plurality of processor-executable instructions; and
a processor coupled to the memory and the communication interface, the processor executing the plurality of processor-executable instructions to:
determine, by a neural network implemented at a server, a first data source and a second data source at which a search is to be performed relating to the input query, based at least in part on characteristics of a potential search object from the input query and data source preferences configured by a user prior to the Internet search, wherein the data source preferences comprise at least one data source that the user deselects;
transmit, via a first search application programming interface (API) integrated at the server, a first search input customized from the input query to the first data source;
transmit, via a second search API integrated at the server, a second search input customized from the input query to the second data source without transmitting any search input to the at least one data source;
obtain a first set of search results from a first search within the first data source and a second set of search results from a second search within the second data source without obtaining any search result from the at least one data source; and
cause a display at a user interface, of a first user-engageable panel displaying the first set of search results with a first indication of the first data source and a second user-engageable panel displaying the second set of search results with a second indication of the second data source.

12. The system of claim 11, wherein the processor executes the plurality of processor-executable instructions further to:
generate an input sequence by concatenating the input query and a user context associated with a user who initiated the input query; and
generate, by a ranking neural model, a first relevance score for the first data source based on the input sequence and a second relevance score for the second data source; and determine that the first data source and the second data source are relevant when the first relevance score and the second relevance score are greater than a threshold.

13. The system of claim 12, wherein the processor executes the plurality of processor-executable instructions further to:
rank the first data source and the second data source based on the first relevance score and the second relevance score.

14. The system of claim 12, wherein the processor executes the plurality of processor-executable instructions further to:
generate, by a parsing neural model, the first search input or the second search input based on the input sequence, and an indication of the first data source or the second data source, respectively.

15. The system of claim 13, wherein the first user-engageable panel and the second user-engageable panel are presented in a ranked order according to the ranking.

16. The system of claim 11, wherein the processor executes the plurality of processor-executable instructions further to:
receive, via the data interface, a user selection of a third data source;
transmit, via a third search API integrated at the server, a third search input customized from the input query to the third data source;
obtain a third set of search results from the third data source; and
present, via the user interface, a third user-engageable panel displaying the third set of search results.

17. The system of claim 11, wherein the processor executes the plurality of processor-executable instructions further to:
receive, via the data interface, a user indication that disapproves the second data source; and
remove the second user-engageable panel from the user interface.

18. The system of claim 12, wherein the user context comprises any combination of:
user profile information;
user configured preferences or dislikes of one or more data sources; and
user past activities approving or disapproving a search result from a specific data source.

19. The system of claim 12, wherein the input sequence further comprises a supplemental context comprising contextual information from one or more data sources pertinent to the input query.

20. A non-transitory computer readable medium storing instructions thereon, that when executed by a computing device cause the computing device to perform operations to present a plurality of search results in response to a search query, the operations comprising:
receiving, via a data interface, an input query for performing an Internet search;
determining, by a neural network implemented at a server, a first data source and a second data source at which a search is to be performed relating to the input query, based at least in part on characteristics of a potential search object from the input query and data source preferences configured by a user prior to the Internet search, wherein the data source preferences comprise at least one data source that the user deselects;
transmitting, via a first search application programming interface (API) integrated at the server, a first search input customized from the input query to the first data source;
transmitting, via a second search API integrated at the server, a second search input customized from the input query to the second data source without transmitting any search input to the at least one data source;
obtaining a first set of search results from a first search within the first data source and a second set of search results from a second search within the second data source without obtaining any search result from the at least one data source; and
causing a display at a user interface, of a first user-engageable panel displaying the first set of search results with a first indication of the first data source and a second user-engageable panel displaying the second set of search results with a second indication of the second data source.

* * * * *